United States Patent
Nagami

(10) Patent No.: US 12,055,699 B2
(45) Date of Patent: Aug. 6, 2024

(54) ZOOM LENS AND IMAGING APPARATUS

(71) Applicant: FUJIFILM Corporation, Tokyo (JP)

(72) Inventor: Ryosuke Nagami, Saitama (JP)

(73) Assignee: FUJIFILM Corporation, Tokyo (JP)

(*) Notice: Subject to any disclaimer, the term of this patent is extended or adjusted under 35 U.S.C. 154(b) by 405 days.

(21) Appl. No.: 17/321,774

(22) Filed: May 17, 2021

(65) Prior Publication Data

US 2021/0364768 A1  Nov. 25, 2021

(30) Foreign Application Priority Data

May 25, 2020 (JP) .................................. 2020-090931

(51) Int. Cl.
    *G02B 15/20* (2006.01)
    *G02B 15/14* (2006.01)
    *G02B 27/00* (2006.01)

(52) U.S. Cl.
    CPC .......... *G02B 15/20* (2013.01); *G02B 15/1461* (2019.08); *G02B 27/0025* (2013.01)

(58) Field of Classification Search
    CPC .......................... G02B 15/20; G02B 15/1461; G02B 27/0025; G02B 15/144105; G02B 13/0015; G02B 13/0045; G02B 13/006; G02B 9/04; G02B 13/007; G02B 7/08; G02B 7/09; G02B 7/10; G02B 27/00; G02B 15/14; G02B 13/00; H04N 23/55; H04N 23/54; G03B 5/02; G03B 2205/0046;

(Continued)

(56) References Cited

U.S. PATENT DOCUMENTS

| 2007/0263299 A1* | 11/2007 | Ohtake | .......... G02B 15/144113 |
| | | | 359/774 |
| 2014/0184856 A1* | 7/2014 | Iwasawa | ................ G02B 15/16 |
| | | | 348/240.99 |
| 2017/0003486 A1 | 1/2017 | Inoue | |

(Continued)

FOREIGN PATENT DOCUMENTS

| JP | 2014-209145 A | 11/2014 |
| JP | 2014209144 A | * 11/2014 |

(Continued)

OTHER PUBLICATIONS

English translation of JP-2014209144, (year 2014).*

(Continued)

*Primary Examiner* — Thomas K Pham
*Assistant Examiner* — Kuei-Jen L Edenfield
(74) *Attorney, Agent, or Firm* — Studebaker & Brackett PC

(57) ABSTRACT

The zoom lens includes, in order from a position closest to an object side to an image side: a first lens group that has a positive refractive power; a second lens group that has a negative refractive power; an intermediate group that has a positive refractive power; and a subsequent group that has a negative refractive power. The first lens group moves during zooming. The second lens group consists of, in order from the object side to the image side, a front group of the second lens group which does not move during image blur correction and an image stabilization group which moves during image blur correction and has a negative refractive power. The zoom lens satisfies predetermined conditional expressions.

17 Claims, 13 Drawing Sheets

EXAMPLE 1

(58) Field of Classification Search
CPC .... G03B 2205/0069; G03B 3/02; G03B 3/10; G03B 17/17; G03B 13/36
USPC ............................... 359/683, 758, 752, 823
See application file for complete search history.

(56) References Cited

U.S. PATENT DOCUMENTS

2019/0302432 A1* 10/2019 Iwasawa .............. G02B 15/173
2020/0319436 A1* 10/2020 Hatada ........... G02B 15/144113

FOREIGN PATENT DOCUMENTS

| | | |
|---|---|---|
| JP | 2015-191008 A | 11/2015 |
| JP | 2017-015930 A | 1/2017 |
| JP | 2019-053122 A | 4/2019 |
| JP | 2021-165829 A | 10/2021 |

OTHER PUBLICATIONS

An Office Action; "Notice of Reasons for Refusal," mailed by the Japanese Patent Office on May 16, 2023, which corresponds to Japanese Patent Application No. 2020-090931 and is related to U.S. Appl. No. 17/321,774; with English language translation.

\* cited by examiner

EXAMPLE 1

EXAMPLE 1

EXAMPLE 1

EXAMPLE 2

EXAMPLE 2

EXAMPLE 3

EXAMPLE 4

EXAMPLE 4

EXAMPLE 5

ZOOM LENS AND IMAGING APPARATUS

CROSS-REFERENCE TO RELATED APPLICATIONS

The present application claims priority under 35 U.S.C. § 119 to Japanese Patent Application No. 2020-090931, filed on May 25, 2020. The above application is hereby expressly incorporated by reference, in its entirety, into the present application.

BACKGROUND OF THE INVENTION

1. Field of the Invention

The technology of the present disclosure relates to a zoom lens and an imaging apparatus.

2. Description of the Related Art

As a zoom lens applicable to an imaging apparatus such as a digital camera and a video camera, lens systems described in JP2019-053122A and JP2015-191008A are known.

SUMMARY OF THE INVENTION

In recent years, there has been a demand for a zoom lens that has image stabilization performance, is compact and lightweight, and maintains favorable optical performance.

The present disclosure has been made in view of the above circumstances, and an object of the present disclosure is to provide a zoom lens, which has image stabilization performance, is advantageous for achieving reduction in size and weight, and maintains favorable optical performance, and an imaging apparatus comprising the zoom lens.

The zoom lens of the present disclosure comprises, in order from a position closest to an object side to an image side: a first lens group that has a positive refractive power; a second lens group that is disposed subsequent to the first lens group and has a negative refractive power; an intermediate group that includes at least one lens group and has a positive refractive power; and a subsequent group that includes at least one lens group and has a negative refractive power. During zooming, the first lens group moves along an optical axis, a distance between the first lens group and the second lens group changes, and a distance between the second lens group and the intermediate group changes, and a distance between the intermediate group and the subsequent group changes, the second lens group consists of, in order from the object side to the image side, a front group of the second lens group which remains stationary during image blur correction and an image stabilization group which moves in a direction intersecting the optical axis during image blur correction and has a negative refractive power, and assuming that a difference in an optical axis direction between a position of the first lens group at a telephoto end and a position of the first lens group at a wide angle end is DL1, a distance on the optical axis from a lens surface closest to the object side in a whole system at the wide angle end to a lens surface closest to the image side in the whole system at the wide angle end is Lw, a lateral magnification of the image stabilization group at the telephoto end in a state where an object at infinity is in focus is βist, and a combined lateral magnification of all lenses closer to the image side than the image stabilization group at the telephoto end in the state where the object at infinity is in focus is βisrt, Conditional Expressions (1) and (2) are satisfied, which are represented by $$0.4 < DL1/Lw < 1 \quad (1), \text{ and}$$

$$3.5 < |(1-\beta ist) \times \beta isrt| < 7 \quad (2).$$

The intermediate group may be configured to consist of an intermediate A group having a positive refractive power and an intermediate B group having a positive refractive power in order from the object side to the image side, and may be configured such that a distance between the intermediate A group and the intermediate B group changes during zooming. In that case, it is preferable that only the intermediate B group moves along the optical axis during focusing.

In a configuration in which only the intermediate B group moves along the optical axis during focusing, assuming that a focal length of the intermediate A group is fmA, and a focal length of the intermediate B group is fmB, it is preferable that Conditional Expression (3) is satisfied, which is represented by $$0.5 < fmA/fmB < 2 \quad (3).$$

In a configuration in which only the intermediate B group moves along the optical axis during focusing, assuming that a distance on the optical axis between the intermediate A group and the intermediate B group at the telephoto end in the state where the object at infinity is in focus is DmAB, and a focal length of the intermediate B group is fmB, it is preferable that Conditional Expression (4) is satisfied, which is represented by $$0.3 < DmAB/fmB < 1 \quad (4).$$

In a configuration in which only the intermediate B group moves along the optical axis during focusing, assuming that a lateral magnification of the intermediate B group at the telephoto end in the state where the object at infinity is in focus is βmBt, and a combined lateral magnification of all lenses closer to the image side than the intermediate B group at the telephoto end in the state where the object at infinity is in focus is βmBrt, it is preferable that Conditional Expression (5) is satisfied, which is represented by $$3 < |(1-\beta mBt^2) \times \beta mBrt^2| < 10 \quad (5).$$

Assuming that a distance on the optical axis from a lens surface closest to the object side in the whole system at the telephoto end to a lens surface closest to the object side in the image stabilization group at the telephoto end is L1ist, and a focal length of the first lens group is f1, it is preferable that Conditional Expression (6) is satisfied, which is represented by $$0.57 < L1ist/f1 < 0.7 \quad (6).$$

It is preferable that the front group of the second lens group has a positive refractive power.

Assuming that a focal length of the whole system at the wide angle end in the state where the object at infinity is in focus is fw, and a focal length of the image stabilization group is fis, it is preferable that Conditional Expression (7) is satisfied, which is represented by $$1 < fw/|fis| < 5 \quad (7).$$

Assuming that a focal length of the whole system at the wide angle end in the state where the object at infinity is in focus is fw, and a focal length of the intermediate group at the wide angle end in the state where the object at infinity is in focus is fmw, it is preferable that Conditional Expression (8) is satisfied, which is represented by $$1 < fw/fmw < 5 \quad (8).$$

Assuming that a focal length of the whole system at the telephoto end in the state where the object at infinity is in focus is ft, and a focal length of the intermediate group at the telephoto end in the state where the object at infinity is in focus is fmt, it is preferable that Conditional Expression (9) is satisfied, which is represented by $$5 < ft/fmt < 10 \quad (9).$$

Assuming that a focal length of the intermediate group at the telephoto end in the state where the object at infinity is in focus is fmt, and a focal length of the intermediate group at the wide angle end in the state where the object at infinity is in focus is fmw, it is preferable that Conditional Expression (10) is satisfied, which is represented by $$0.8 < fmt/fmw < 1.8 \quad (10).$$

Assuming that a focal length of the whole system at the wide angle end in the state where the object at infinity is in focus is fw, and a focal length of a lens group having a strongest negative refractive power in the subsequent group is fsmax, it is preferable that Conditional Expression (11) is satisfied, which is represented by $$1 < |fw/fsmax| < 4 \quad (11).$$

It is preferable that the subsequent group consists of a lens group having a negative refractive power and a lens group having a positive refractive power in order from the object side to the image side, and a distance between the lens group having the negative refractive power and the lens group having the positive refractive power changes during zooming.

It is preferable that a stop is disposed between the second lens group and the intermediate group.

Assuming that a focal length of the whole system at the telephoto end in the state where the object at infinity is in focus is ft, and a focal length of the whole system at the wide angle end in the state where the object at infinity is in focus is fw, it is preferable that Conditional Expression (12) is satisfied, which is represented by $$3 < ft/fw < 5 \quad (12).$$

Assuming that a distance on the optical axis from a lens surface closest to the object side in a whole system at the wide angle end to a lens surface closest to the image side in the whole system at the wide angle end is Lw and a focal length of the whole system at the wide angle end in the state where the object at infinity is in focus is fw, it is preferable that Conditional Expression (13) is satisfied, which is represented by $$1.3 < Lw/fw < 1.6 \quad (13).$$

Assuming that a back focal length of the whole system at an air conversion distance at the wide angle end in the state where the object at infinity is in focus is Bfw, and a focal length of the whole system at the wide angle end in the state where the object at infinity is in focus is fw, it is preferable that Conditional Expression (14) is satisfied, which is represented by $$0.35 < Bfw/fw < 0.55 \quad (14).$$

It is preferable that the subsequent group includes a lens group that remains stationary with respect to an image plane during zooming at a position closest to the image side.

The imaging apparatus according another aspect of the present disclosure comprises the zoom lens according to the aspect of the present disclosure.

In the present specification, it should be noted that the terms "consisting of ~" and "consists of ~" mean that the lens may include not only the above-mentioned constituent elements but also lenses substantially having no refractive powers, optical elements, which are not lenses, such as a stop, a filter, and a cover glass, and mechanism parts such as a lens flange, a lens barrel, an imaging element, and a camera shaking correction mechanism.

In the present specification, the term "~ group having a positive refractive power" means that the group has a positive refractive power as a whole. Similarly, the term "~ group having a negative refractive power" means that the group has a negative refractive power as a whole. The terms "a lens having a positive refractive power" and "a positive lens" are synonymous. The terms "a lens having a negative refractive power" and "a negative lens" are synonymous. The term "~ lens group" is not limited to a configuration consisting of a plurality of lenses, but may consist of only one lens.

A compound aspheric lens (a lens in which a spherical lens and an aspheric film formed on the spherical lens are integrally formed and function as one aspheric lens as a whole) is not regarded as cemented lenses, but the compound aspheric lens is regarded as one lens. The sign of the refractive power and the surface shape of the lens including the aspheric surface will be considered in terms of the paraxial region unless otherwise specified.

In the present specification, the term "whole system" means "zoom lens". The "back focal length at the air conversion distance" is the air conversion distance on the optical axis from the lens surface closest to the image side in the whole system to the image plane in a state where the object at infinity is in focus. The "focal length" used in a conditional expression is a paraxial focal length. The values used in Conditional Expressions are values in a case where the d line is used as a reference in a state where the object at infinity is in focus. The "d line", "C line", "F line", and "g line" described in this specification are emission lines. In this specification, it is assumed that the d line wavelength is 587.56 nm (nanometers), the C line wavelength is 656.27 nm (nanometers), the F line wavelength is 486.13 nm (nanometers), and the g line wavelength is 435.84 nm (nanometers).

According to the present disclosure, it is possible to provide a zoom lens, which has image stabilization performance, is advantageous for achieving reduction in size and weight, and maintains favorable optical performance, and an imaging apparatus comprising the zoom lens.

DESCRIPTION OF THE PREFERRED EMBODIMENTS

Figure 1:
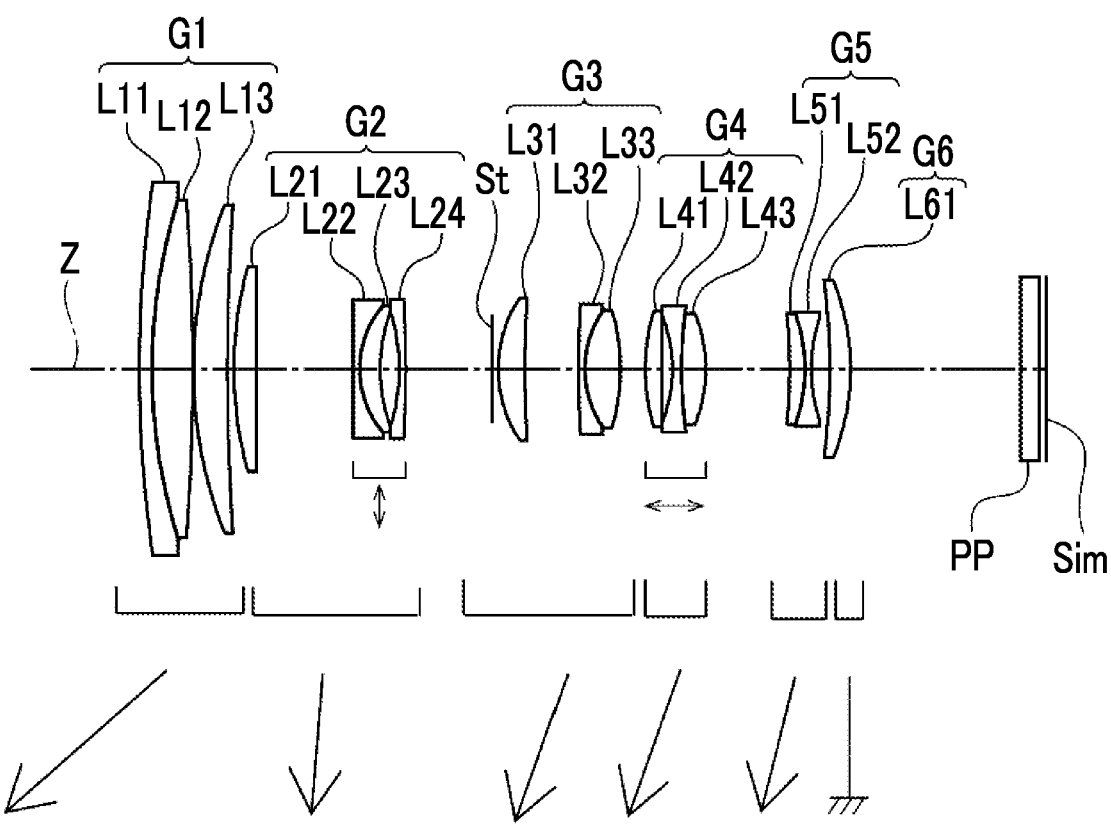
FIG. 1 is a cross-sectional view of a configuration of a zoom lens of Example 1 and a diagram showing movement directions thereof.

Hereinafter, embodiments of the present disclosure will be described. The zoom lens according to an embodiment of the present disclosure comprises, in order from a position closest to an object side to an image side: a first lens group that has a positive refractive power; a second lens group that is disposed subsequent to the first lens group and has a negative refractive power; an intermediate group that includes at least one lens group and has a positive refractive power; and a subsequent group that includes at least one lens group and has a negative refractive power. During zooming from the wide angle end to the telephoto end, the first lens group moves along an optical axis, a distance between the first lens group and the second lens group changes, and a distance between the second lens group and the intermediate group changes, and a distance between the intermediate group and the subsequent group changes. By adopting such a configuration, it is possible to realize zooming from the wide angle end to the telephoto end, it is easy to make a configuration having a small size even in this zoomed state, and it is easy to suppress fluctuation in aberrations due to zooming.

It should be noted that the term "lens group" in the present specification refers to a part including the at least one lens, which is a constituent part of the zoom lens and is divided by an air distance that changes during zooming. During zooming, the lens groups move or remain stationary, and the mutual distance between the lenses in one lens group does not change.

The second lens group consists of, in order from the object side to the image side, a front group of the second lens group which remains stationary during image blur correction and an image stabilization group which moves in a direction intersecting the optical axis during image blur correction and has a negative refractive power. By making only a part of the second lens group an image stabilization group instead of making the entire second lens group an image stabilization group, the entire second lens group and the image stabilization group can be made to have different refractive powers from each other. Thereby, it is easy to control the refractive power of the image stabilization group. Thus, there is an advantage in ensuring favorable image stabilization performance and achieving reduction in size of the image stabilization group.

It is preferable that the front group of the second lens group has a positive refractive power. In such a case, the diameter of the rays incident on the image stabilization group can be reduced. Thus, there is an advantage in achieving reduction in diameter of an image stabilization unit. Further, in a case where the front group of the second lens group has a positive refractive power, it is easy to increase the negative refractive power of the image stabilization group. Therefore, there is an advantage in reducing the amount of movement of the image stabilization group during image blur correction.

The intermediate group can be configured to consist of an intermediate A group having a positive refractive power and an intermediate B group having a positive refractive power in order from the object side to the image side, and can be configured such that a distance between the intermediate A group and the intermediate B group changes during zooming. In such a case, the positive refractive power of the intermediate group can be shared between the intermediate A group and the intermediate B group. Thus, there is an advantage in suppressing fluctuation in spherical aberration during zooming.

In a case where the intermediate group consists of the intermediate A group and the intermediate B group, it is preferable that only the intermediate B group moves along the optical axis during focusing. In the following, the group that moves during focusing will be referred to as a focus group. In a case where the intermediate B group is set as the focus group, the focus group is located adjacent to the image side of the intermediate A group having a positive refractive power. Thus, there is an advantage in achieving reduction in diameter of the focus group.

Next, a preferable configuration relating to conditional expressions will be described. However, the conditional expressions that the zoom lens of the present disclosure preferably satisfies are not limited to the conditional expressions described in the form of the expression, and the lower limit and the upper limit are selected from the preferable and more preferable conditional expressions. The conditional expressions may include all conditional expressions obtained through optional combinations. In the following description of preferred configurations and possible configurations, the zoom lens of the present disclosure is also referred to as a zoom lens.

Assuming that a difference in the optical axis direction between the position of the first lens group at the telephoto end and the position of the first lens group at the wide angle end is DL1, and the distance on the optical axis from the lens surface closest to the object side in the whole system at the wide angle end to the lens surface closest to the image side in the whole system at the wide angle end is Lw, it is preferable that the zoom lens satisfies Conditional Expression (1). By not allowing the corresponding value of Conditional Expression (1) to be equal to or less than the lower limit, the amount of movement of the first lens group during zooming is prevented from becoming excessively small. Thus, there is an advantage in achieving an increase in zoom ratio. By not allowing the corresponding value of Conditional Expression (1) to be equal to or greater than the upper limit, the amount of movement of the first lens group during zooming is prevented from becoming excessively large. Thus, there is an advantage in reducing the total length. In addition, there is an advantage in achieving reduction in diameter and weight. By satisfying Conditional Expression (1), there is an advantage in obtaining a high zoom ratio while achieving reduction in size and weight. In order to obtain more favorable characteristics, it is more preferable that the zoom lens satisfies Conditional Expression (1-1).

$$0.4 < DL1/Lw < 1 \tag{1}$$

$$0.5 < DL1/Lw < 0.85 \tag{1-1}$$

Assuming that a lateral magnification of the image stabilization group at the telephoto end in a state where an object at infinity is in focus is βist, and a combined lateral magnification of all lenses closer to the image side than the image stabilization group at the telephoto end in the state where the object at infinity is in focus is βisrt, it is preferable that the zoom lens satisfies Conditional Expression (2). By not allowing the corresponding value of Conditional Expression (2) to be equal to or less than the lower limit, the amount of movement of the image stabilization group during image blur correction is prevented from becoming excessively large. Thus, there is an advantage in achieving reduction in size. By not allowing the corresponding value of Conditional Expression (2) to be equal to or greater than the upper limit, the position accuracy of the image stabilization group during image blur correction is prevented from becoming excessively sensitive. Therefore, control therefor is made to be easy. By satisfying Conditional Expression (2), there is an advantage in achieving reduction in size of the image stabilization unit and ensuring suitable image stabilization performance. In order to obtain more favorable characteristics, it is more preferable that the zoom lens satisfies Conditional Expression (2-1).

$$3.5<|(1-\beta ist)\times\beta isrt|<7 \tag{2}$$

$$3.5<|(1-\beta ist)\times\beta isrt|<5.5 \tag{2-1}$$

In a configuration in which the intermediate group consists of the intermediate A group and the intermediate B group and the focus group consists of the intermediate B group, assuming that a focal length of the intermediate A group is fmA, and a focal length of the intermediate B group is fmB, it is preferable that the zoom lens satisfies Conditional Expression (3). By not allowing the corresponding value of Conditional Expression (3) to be equal to or less than the lower limit, the amount of movement of the focus group during focusing is prevented from becoming excessively large. Thus, there is an advantage in reducing the total length. By not allowing the corresponding value of Conditional Expression (3) to be equal to or greater than the upper limit, there is an advantage in suppressing fluctuation in spherical aberration during focusing. By satisfying Conditional Expression (3), there is an advantage in reducing the total length and suppressing spherical aberration. In order to obtain more favorable characteristics, it is more preferable that the zoom lens satisfies Conditional Expression (3-1).

$$0.5<fmA/fmB<2 \tag{3}$$

$$0.8<fmA/fmB<1.2 \tag{3-1}$$

In the configuration in which the intermediate group consists of the above intermediate A group and the intermediate B group and the focus group consists of the intermediate B group, assuming that a distance on the optical axis between the intermediate A group and the intermediate B group at the telephoto end in the state where the object at infinity is in focus is DmAB, and a focal length of the intermediate B group is fmB, it is preferable that the zoom lens satisfies Conditional Expression (4). By not allowing the corresponding value of Conditional Expression (4) to be equal to or less than the lower limit, DmAB is prevented from becoming excessively narrower than the refractive power of the intermediate B group. Thus, there is an advantage in short-range imaging. By not allowing the corresponding value of Conditional Expression (4) to be equal to or greater than the upper limit, DmAB is prevented from becoming excessively wider than the refractive power of the intermediate B group. Thus, there is an advantage in achieving reduction in size. By satisfying Conditional Expression (4), there is an advantage in reducing the shortest imaging distance and achieving reduction in size. In order to obtain more favorable characteristics, it is more preferable that the zoom lens satisfies Conditional Expression (4-1).

$$0.3<DmAB/fmB<1 \tag{4}$$

$$0.35<DmAB/fmB<0.7 \tag{4-1}$$

In a configuration in which the intermediate group consists of the above intermediate A group and the intermediate B group and the focus group consists of the intermediate B group, assuming that a lateral magnification of the intermediate B group at the telephoto end in the state where the object at infinity is in focus is βmBt, and a combined lateral magnification of all lenses closer to the image side than the intermediate B group at the telephoto end in the state where the object at infinity is in focus is βmBrt, it is preferable that the zoom lens satisfies Conditional Expression (5). By not allowing the corresponding value of Conditional Expression (5) to be equal to or less than the lower limit, the amount of movement of the focus group during focusing on the short range side is prevented from becoming excessively large. Thus, there is an advantage in achieving reduction in size. By not allowing the corresponding value of Conditional Expression (5) to be equal to or greater than the upper limit, the position accuracy of the focus group during focusing is prevented from becoming excessively sensitive. Therefore, control therefor is made to be easy. By satisfying Conditional Expression (5), there is an advantage in achieving reduction in size of a focus unit and reducing the shortest imaging distance. In order to obtain more favorable characteristics, it is more preferable that the zoom lens satisfies Conditional Expression (5-1).

$$3<|(1-\beta mBt^2)\times\beta mBrt^2|<10 \tag{5}$$

$$5<|(1-\beta mBt^2)\times\beta mBrt^2|<7 \tag{5-1}$$

Assuming that a distance on the optical axis from a lens surface closest to the object side in the whole system at the telephoto end to a lens surface closest to the object side in the image stabilization group at the telephoto end is L1ist, and a focal length of the first lens group is f1, it is preferable that the zoom lens satisfies Conditional Expression (6). By not allowing the corresponding value of Conditional Expression (6) to be equal to or less than the lower limit, the refractive power of the first lens group is prevented from becoming excessively weak. Therefore, the diameter of the incident rays to the image stabilization group especially at the telephoto end can be reduced. Thereby, there is an advantage in achieving reduction in diameter of the image stabilization unit. By not allowing the corresponding value of Conditional Expression (6) to be equal to or greater than the upper limit, there is an advantage in reducing the total length, or it is easy to correct various aberrations, particularly spherical aberration, over the whole system. By satisfying Conditional Expression (6), there is an advantage in achieving reduction in size and correcting aberrations. In order to obtain more favorable characteristics, it is more preferable that the zoom lens satisfies Conditional Expression (6-1).

$$0.57<L1ist/f1<0.7 \tag{6}$$

$$0.58<L1ist/f1<0.67 \tag{6-1}$$

Assuming that a focal length of the whole system at the wide angle end in the state where the object at infinity is in focus is fw, and a focal length of the image stabilization group is fis, it is preferable that the zoom lens satisfies Conditional Expression (7). By not allowing the corresponding value of Conditional Expression (7) to be equal to or less than the lower limit, the amount of movement of the image stabilization group during image blur correction is prevented from becoming excessively large. Thus, there is an advantage in achieving reduction in size. By not allowing the corresponding value of Conditional Expression (7) to be equal to or greater than the upper limit, the position accuracy of the image stabilization group during image blur correction is prevented from becoming excessively sensitive. Therefore, control therefor is made to be easy. By satisfying Conditional Expression (7), there is an advantage in achieving reduction in size of the image stabilization unit and ensuring suitable image stabilization performance. In order to obtain more favorable characteristics, it is more preferable that the zoom lens satisfies Conditional Expression (7-1).

$$1 < fw/|fis| < 5 \tag{7}$$

$$2 < fw/|fis| < 4 \tag{7-1}$$

Assuming that a focal length of the whole system at the wide angle end in the state where the object at infinity is in focus is fw, and a focal length of the intermediate group at the wide angle end in the state where the object at infinity is in focus is fmw, it is preferable that the zoom lens satisfies Conditional Expression (8). By not allowing the corresponding value of Conditional Expression (8) to be equal to or less than the lower limit, it is possible to suppress an increase in diameter of the rays incident on the subsequent group. Thus, there is an advantage in achieving reduction in diameter. By not allowing the corresponding value of Conditional Expression (8) to be equal to or greater than the upper limit, it is easy to suppress fluctuation in aberrations during zooming. By satisfying Conditional Expression (8), there is an advantage in achieving reduction in diameter and suppressing fluctuation in aberrations during zooming. In order to obtain more favorable characteristics, it is more preferable that the zoom lens satisfies Conditional Expression (8-1).

$$1 < fw/fmw < 5 \tag{8}$$

$$2 < fw/fmw < 3.5 \tag{8-1}$$

Assuming that a focal length of the whole system at the telephoto end in the state where the object at infinity is in focus is ft, and a focal length of the intermediate group at the telephoto end in the state where the object at infinity is in focus is fmt, it is preferable that the zoom lens satisfies Conditional Expression (9). By not allowing the corresponding value of Conditional Expression (9) to be equal to or less than the lower limit, it is possible to suppress an increase in diameter of the rays incident on the subsequent group. Thus, there is an advantage in achieving reduction in diameter. By not allowing the corresponding value of Conditional Expression (9) to be equal to or greater than the upper limit, it is easy to suppress fluctuation in aberrations during zooming. By satisfying Conditional Expression (9), there is an advantage in achieving reduction in diameter and suppressing fluctuation in aberrations during zooming. In order to obtain more favorable characteristics, it is more preferable that the zoom lens satisfies Conditional Expression (9-1).

$$5 < ft/fmt < 10 \tag{9}$$

$$6.5 < ft/fmt < 8.5 \tag{9-1}$$

Assuming that a focal length of the intermediate group at the telephoto end in the state where the object at infinity is in focus is fmt, and a focal length of the intermediate group at the wide angle end in the state where the object at infinity is in focus is fmw, it is preferable that the zoom lens satisfies Conditional Expression (10). By not allowing the corresponding value of Conditional Expression (10) to be equal to or less than the lower limit, there is an advantage in suppressing fluctuation in aberrations on the telephoto side during zooming. By not allowing the corresponding value of Conditional Expression (10) to be equal to or greater than the upper limit, there is an advantage in suppressing fluctuation in aberrations on the wide angle side during zooming. By satisfying Conditional Expression (10), there is an advantage in suppressing fluctuation in aberrations during zooming. In order to obtain more favorable characteristics, it is more preferable that the zoom lens satisfies Conditional Expression (10-1).

$$0.8 < fmt/fmw < 1.8 \tag{10}$$

$$1.1 < fmt/fmw < 1.7 \tag{10-1}$$

Assuming that a focal length of the whole system at the wide angle end in the state where the object at infinity is in focus is fw, and a focal length of a lens group having a strongest negative refractive power in the subsequent group is fsmax, it is preferable that the zoom lens satisfies Conditional Expression (11). By not allowing the corresponding value of Conditional Expression (11) to be equal to or less than the lower limit, there is an advantage in achieving an increase in zoom ratio. By not allowing the corresponding value of Conditional Expression (11) to be equal to or greater than the upper limit, there is an advantage in suppressing fluctuation in aberrations, particularly, fluctuation in astigmatism during zooming. By satisfying Conditional Expression (11), there is an advantage in achieving an increase in zoom ratio and suppressing fluctuation in aberrations during zooming. In particular, the above effect is remarkably obtained in a case where the lens group having the strongest negative refractive power in the subsequent group is a lens group that moves during zooming. In order to obtain more favorable characteristics, it is more preferable that the zoom lens satisfies Conditional Expression (11-1).

$$1 < fw/|fsmax| < 4 \tag{11}$$

$$2 < fw/|fsmax| < 3.5 \tag{11-1}$$

Assuming that a focal length of the whole system at the telephoto end in the state where the object at infinity is in focus is ft, and a focal length of the whole system at the wide angle end in the state where the object at infinity is in focus is fw, it is preferable that the zoom lens satisfies Conditional Expression (12). By not allowing the corresponding value of Conditional Expression (12) to be equal to or less than the lower limit, it is easy to ensure a zoom ratio suitable for the zoom lens. By not allowing the corresponding value of Conditional Expression (12) to be equal to or greater than the upper limit, there is an advantage in achieving reduction in size. By satisfying Conditional Expression (12), there is an advantage in ensuring a suitable zoom ratio while making a configuration having a small size. In order to obtain more favorable characteristics, it is more preferable that the zoom lens satisfies Conditional Expression (12-1).

$$3 < ft/fw < 5 \tag{12}$$

$$3.9 < ft/fw < 4.2 \tag{12-1}$$

Assuming that a distance on the optical axis from a lens surface closest to the object side in a whole system at the wide angle end to a lens surface closest to the image side in the whole system at the wide angle end is Lw and a focal length of the whole system at the wide angle end in the state where the object at infinity is in focus is fw, it is preferable that the zoom lens satisfies Conditional Expression (13). By not allowing the corresponding value of Conditional Expression (13) to be equal to or less than the lower limit, there is an advantage in suppressing field curvature. By not allowing the corresponding value of Conditional Expression (13) to be equal to or greater than the upper limit, there is an advantage in reducing the total length. Thereby, there is also advantage in achieving reduction in weight. By satisfying Conditional Expression (13), there is an advantage in suppressing field curvature and achieving reduction in size and weight. In order to obtain more favorable characteristics, it is more preferable that the zoom lens satisfies Conditional Expression (13-1).

$$1.3 < Lw/fw < 1.6 \tag{13}$$

$$1.35 < Lw/fw < 1.55 \tag{13-1}$$

Assuming that a back focal length of the whole system at an air conversion distance at the wide angle end in the state where the object at infinity is in focus is Bfw, and a focal length of the whole system at the wide angle end in the state where the object at infinity is in focus is fw, it is preferable that the zoom lens satisfies Conditional Expression (14). By not allowing the corresponding value of Conditional Expression (14) to be equal to or less than the lower limit, it is possible to suppress an increase in outer diameter of the lens on the image side. Thus, there is an advantage in achieving reduction in size and weight. By not allowing the corresponding value of Conditional Expression (14) to be equal to or greater than the upper limit, there is an advantage in correcting lateral chromatic aberration. In addition, there is an advantage in achieving reduction in weight since the total length can be reduced. By satisfying Conditional Expression (14), there is an advantage in correcting lateral chromatic aberration and achieving reduction in size and weight. In order to obtain more favorable characteristics, it is more preferable that the zoom lens satisfies Conditional Expression (14-1).

$$0.35 < Bfw/fw < 0.55 \tag{14}$$

$$0.35 < Bfw/fw < 0.48 \tag{14-1}$$

Assuming that a radius of curvature of the lens surface closest to the image side in the first lens group is R1r and a radius of curvature of the lens surface closest to the object side in the second lens group is R2f, it is preferable that the zoom lens satisfies Conditional Expression (15). By satisfying Conditional Expression (15), there is an advantage in suppressing fluctuation in spherical aberration during zooming. Thereby, it is easy to reduce the load of aberration correction in other lens groups. In order to obtain more favorable characteristics, it is more preferable that the zoom lens satisfies Conditional Expression (15-1).

$$0.8 < (R1r+R2f)/(R1r-R2f) < 4 \tag{15}$$

$$1.2 < (R1r+R2f)/(R1r-R2f) < 2.5 \tag{15-1}$$

Assuming that a lateral magnification of the image stabilization group at the wide angle end in a state where an object at infinity is in focus is βisw, and a combined lateral magnification of all lenses closer to the image side than the image stabilization group at the wide angle end in the state where the object at infinity is in focus is βisrw, it is preferable that the zoom lens satisfies Conditional Expression (16). By not allowing the corresponding value of Conditional Expression (16) to be equal to or less than the lower limit, the amount of movement of the image stabilization group during image blur correction is prevented from becoming excessively large. Thus, there is an advantage in achieving reduction in size. By not allowing the corresponding value of Conditional Expression (16) to be equal to or greater than the upper limit, the position accuracy of the image stabilization group during image blur correction is prevented from becoming excessively sensitive. Therefore, control therefor is made to be easy. By satisfying Conditional Expression (16), there is an advantage in achieving reduction in size of the image stabilization unit and ensuring suitable image stabilization performance. In order to obtain more favorable characteristics, it is more preferable that the zoom lens satisfies Conditional Expression (16-1).

$$1 < |(1-\beta isw) \times \beta isrw| < 5 \tag{16}$$

$$1.75 < |(1-\beta isw) \times \beta isrw| < 3 \tag{16-1}$$

In a configuration in which the intermediate group consists of the above intermediate A group and the intermediate B group and the focus group consists of the intermediate B group, assuming that a lateral magnification of the intermediate B group at the wide angle end in the state where the object at infinity is in focus is βmBw, and a combined lateral magnification of all lenses closer to the image side than the intermediate B group at the wide angle end in the state where the object at infinity is in focus is βmBrw, it is preferable that the zoom lens satisfies Conditional Expression (17). By not allowing the corresponding value of Conditional Expression (17) to be equal to or less than the lower limit, the amount of movement of the focus group during focusing on the short range side is prevented from becoming excessively large. Thus, there is an advantage in achieving reduction in size. By not allowing the corresponding value of Conditional Expression (17) to be equal to or greater than the upper limit, the position accuracy of the focus group during focusing is prevented from becoming excessively sensitive. Therefore, control therefor is made to be easy. By satisfying Conditional Expression (17), there is an advantage in achieving reduction in size of the focus unit and reducing the shortest imaging distance. In order to obtain more favorable characteristics, it is more preferable that the zoom lens satisfies Conditional Expression (17-1).

$$1 < |(1-\beta mBw^2) \times \beta mBrw^2| < 10 \tag{17}$$

$$3 < |(1-\beta mBw^2) \times \beta mBrw^2| < 5 \tag{17-1}$$

Assuming that a focal length of the whole system at the wide angle end in the state where the object at infinity is in focus is fw, and a focal length of the first lens group is f1, it is preferable that the zoom lens satisfies Conditional Expression (18). By not allowing the corresponding value of Conditional Expression (18) to be equal to or less than the lower limit, it is possible to suppress an increase in diameter of the rays incident on the second lens group. Thus, there is an advantage in achieving reduction in size of the whole system. By not allowing the corresponding value of Conditional Expression (18) to be equal to or greater than the upper limit, it is easy to correct various aberrations, particularly spherical aberration, over the whole system. By satisfying Conditional Expression (18), there is an advantage in achieving reduction in size and correcting various aberrations. In order to obtain more favorable characteristics, it is more preferable that the zoom lens satisfies Conditional Expression (18-1).

$$0.3 < fw/f1 < 0.8 \tag{18}$$

$$0.4 < fw/f1 < 0.7 \tag{18-1}$$

Assuming that a focal length of the whole system at the telephoto end in the state where the object at infinity is in focus is ft, and a focal length of the first lens group is f1, it is preferable that the zoom lens satisfies Conditional Expression (19). By not allowing the corresponding value of Conditional Expression (19) to be equal to or less than the lower limit, it is possible to suppress an increase in diameter of the rays incident on the second lens group. Thus, there is an advantage in achieving reduction in size of the whole system. By not allowing the corresponding value of Conditional Expression (19) to be equal to or greater than the upper limit, it is easy to correct various aberrations, particularly spherical aberration, over the whole system. By satisfying Conditional Expression (19), there is an advantage in achieving reduction in size and correcting various aberrations. In order to obtain more favorable characteristics, it is more preferable that the zoom lens satisfies Conditional Expression (19-1).

$$1.7 < ft/f1 < 3 \tag{19}$$

$$1.8 < ft/f1 < 2.7 \tag{19-1}$$

Assuming that a focal length of the whole system at the telephoto end in the state where the object at infinity is in focus is ft, and a focal length of the second lens group is f2, it is preferable that the zoom lens satisfies Conditional Expression (20). By not allowing the corresponding value of Conditional Expression (20) to be equal to or less than the lower limit, there is an advantage in achieving an increase in zoom ratio. By not allowing the corresponding value of Conditional Expression (20) to be equal to or greater than the upper limit, it is possible to suppress an increase in diameter of the rays incident on the intermediate group. Thus, there is an advantage in achieving reduction in size of the whole system. By satisfying Conditional Expression (20), there is an advantage in achieving an increase in zoom ratio and reduction in size. In order to obtain more favorable characteristics, it is more preferable that the zoom lens satisfies Conditional Expression (20-1).

$$7 < ft/|f2| < 15 \tag{20}$$

$$8 < ft/|f2| < 14 \tag{20-1}$$

Assuming that a focal length of the intermediate group at the wide angle end in the state where the object at infinity is in focus is fmw, and a focal length of the second lens group is f2, it is preferable that the zoom lens satisfies Conditional Expression (21). By not allowing the corresponding value of Conditional Expression (21) to be equal to or less than the lower limit, the negative refractive power of the second lens group is prevented from becoming excessively weak. Thus, there is an advantage in achieving an increase in zoom ratio. By not allowing the corresponding value of Conditional Expression (21) to be equal to or greater than the upper limit, the negative refractive power of the second lens group is prevented from becoming excessively strong. Therefore, it is possible to suppress an increase in diameter of the rays incident on the intermediate group and the group closer to the image side than the intermediate group. Thus, there is an advantage in achieving reduction in size. By satisfying Conditional Expression (21), there is an advantage in achieving an increase in zoom ratio and reduction in size. In order to obtain more favorable characteristics, it is more preferable that the zoom lens satisfies Conditional Expression (21-1).

$$0.8 < fmw/|f2| < 1.3 \tag{21}$$

$$0.85 < fmw/|f2| < 1.1 \tag{21-1}$$

Assuming that a focal length of the intermediate group at the telephoto end in the state where the object at infinity is in focus is fmt, and a focal length of the second lens group is f2, it is preferable that the zoom lens satisfies Conditional Expression (22). By not allowing the corresponding value of Conditional Expression (22) to be equal to or less than the lower limit, the negative refractive power of the second lens group is prevented from becoming excessively weak. Thus, there is an advantage in achieving an increase in zoom ratio. By not allowing the corresponding value of Conditional Expression (22) to be equal to or greater than the upper limit, the negative refractive power of the second lens group is prevented from becoming excessively strong. Therefore, it is possible to suppress an increase in diameter of the rays incident on the intermediate group and the group closer to the image side than the intermediate group. Thus, there is an advantage in achieving reduction in size. By satisfying Conditional Expression (22), there is an advantage in achieving an increase in zoom ratio and reduction in size. In order to obtain more favorable characteristics, it is more preferable that the zoom lens satisfies Conditional Expression (22-1).

$$0.9 < fmt/|f2| < 2 \tag{22}$$

$$1 < fmt/|f2| < 1.8 \tag{22-1}$$

In a case where the intermediate group includes at least one positive lens, assuming that the Abbe number based on the d line of the positive lens in the intermediate group is vmp, it is preferable that the intermediate group includes at least one positive lens satisfying Conditional Expression (23). By not allowing the corresponding value of Conditional Expression (23) to be equal to or less than the lower limit, there is an advantage in correcting longitudinal chromatic aberration on the telephoto side. By not allowing the corresponding value of Conditional Expression (23) to be equal to or greater than the upper limit, it is possible to prevent the refractive index of the positive lens from becoming excessively low. Thereby, it is easy to ensure the refractive power without extremely reducing the absolute value of the radius of curvature of the lens surface, and it is possible to prevent enlargement of the lens in the optical axis direction. As a result, there is an advantage in achieving reduction in size and weight of the intermediate group. By satisfying Conditional Expression (23), there is an advantage in correcting longitudinal chromatic aberration and achieving reduction in size and weight. In order to obtain more favorable characteristics, it is more preferable that the intermediate group includes at least one positive lens satisfying Conditional Expression (23-1).

$$70 < vmp < 100 \tag{23}$$

$$80 < vmp < 96 \tag{23-1}$$

In a configuration in which the front group of the second lens group has a positive refractive power, assuming the Abbe number of the positive lens of the front group of the second lens group based on the d line is v2p, it is preferable that the front group of the second lens group includes at least one positive lens satisfying Conditional Expression (24). By not allowing the corresponding value of Conditional Expression (24) to be equal to or less than the lower limit, there is an advantage in correcting longitudinal chromatic aberration on the telephoto side. By not allowing the corresponding value of Conditional Expression (24) to be equal to or greater than the upper limit, it is possible to prevent the refractive index of the positive lens from becoming excessively low. Thereby, it is easy to ensure the refractive power without extremely reducing the absolute value of the radius of curvature of the lens surface, and it is possible to prevent enlargement of the lens in the optical axis direction. As a result, there is an advantage in achieving reduction in size and weight of the front group of the second lens group. By satisfying Conditional Expression (24), there is an advantage in correcting longitudinal chromatic aberration and achieving reduction in size and weight. In order to obtain more favorable characteristics, it is more preferable that the front group of the second lens group includes at least one positive lens satisfying Conditional Expression (24-1).

$$50 < v2p < 90 \tag{24}$$

$$65 < v2p < 85 \tag{24-1}$$

Assuming that a radius of curvature of the lens surface closest to the object side in the first lens group is R1f and a radius of curvature of the lens surface closest to the image side in the first lens group is R1r, it is preferable that the zoom lens satisfies Conditional Expression (25). By satisfying Conditional Expression (25), there is an advantage in correcting spherical aberration. Thereby, it is easy to reduce the load of correcting aberrations in other lens groups. In order to obtain more favorable characteristics, it is more preferable that the zoom lens satisfies Conditional Expression (25-1).

$$-6 < (R1f + R1r)/(R1f - R1r) < -1 \tag{25}$$

$$-5 < (R1f + R1r)/(R1f - R1r) < -2 \tag{25-1}$$

Assuming that an average value of Abbe numbers of all the positive lenses in the first lens group based on the d line is vave1p, it is preferable that the zoom lens satisfies Conditional Expression (26). By not allowing the corresponding value of Conditional Expression (26) to be equal to or less than the lower limit, there is an advantage in correcting longitudinal chromatic aberration on the telephoto side. By not allowing the corresponding value of Conditional Expression (26) to be equal to or greater than the upper limit, it is possible to prevent the refractive index of the positive lens from becoming excessively low. Thereby, it is easy to ensure the refractive power without extremely reducing the absolute value of the radius of curvature of the lens surface, and it is possible to prevent enlargement of the lens in the optical axis direction. As a result, there is an advantage in achieving reduction in size and weight of the first lens group. By satisfying Conditional Expression (26), there is an advantage in correcting longitudinal chromatic aberration and achieving reduction in size and weight. In order to obtain more favorable characteristics, it is more preferable that the zoom lens satisfies Conditional Expression (26-1).

$$65 < vave1p < 85 \tag{26}$$

$$70 < vave1p < 80 \tag{26-1}$$

Assuming that an average value of Abbe numbers of all the negative lenses in the second lens group based on the d line is vave2n, it is preferable that the zoom lens satisfies Conditional Expression (27). By not allowing the corresponding value of Conditional Expression (27) to be equal to or less than the lower limit, there is an advantage in correcting chromatic aberration. By not allowing the corresponding value of Conditional Expression (27) to be equal to or greater than the upper limit, it is possible to prevent the refractive index of the negative lens from becoming excessively low. Thereby, it is easy to ensure the refractive power without extremely reducing the absolute value of the radius of curvature of the lens surface, and it is possible to prevent an increase in lens volume. As a result, there is an advantage in achieving reduction in weight of the image stabilization unit. By satisfying Conditional Expression (27), there is an advantage in correcting chromatic aberration and achieving reduction in weight. In order to obtain more favorable characteristics, it is more preferable that the zoom lens satisfies Conditional Expression (27-1).

$$30 < vave2n < 60 \tag{27}$$

$$35 < vave2n < 52 \tag{27-1}$$

In the configuration in which the intermediate group consists of the intermediate A group and the intermediate B group, assuming that an average value of Abbe numbers of all the positive lenses in the intermediate A group based on the d-line is vavemAp, it is preferable that the zoom lens satisfies Conditional Expression (28). By not allowing the corresponding value of Conditional Expression (28) to be equal to or less than the lower limit, there is an advantage in correcting longitudinal chromatic aberration on the telephoto side. By not allowing the corresponding value of Conditional Expression (28) to be equal to or greater than the upper limit, it is possible to prevent the refractive index of the positive lens from becoming excessively low. Thereby, it is easy to ensure the refractive power without extremely reducing the absolute value of the radius of curvature of the lens surface, and it is possible to prevent enlargement of the lens in the optical axis direction. As a result, there is an advantage in achieving reduction in size and weight of the intermediate group. By satisfying Conditional Expression (28), there is an advantage in correcting longitudinal chromatic aberration and achieving reduction in size and weight. In order to obtain more favorable characteristics, it is more preferable that the zoom lens satisfies Conditional Expression (28-1).

$$60 < vavemAp < 85 \tag{28}$$

$$67 < vavemAp < 80 \tag{28-1}$$

In a case where the image stabilization group includes at least one positive lens and the Abbe number of the positive lens of the image stabilization group based on the d line is visp, it is preferable that the image stabilization group includes at least one positive lens satisfying Conditional Expression (29). By satisfying Conditional Expression (29), there is an advantage in suppressing fluctuation in lateral chromatic aberration during image blur correction. In order to obtain more favorable characteristics, it is more preferable that the image stabilization group includes at least one positive lens satisfying Conditional Expression (29-1).

$$15 < visp < 40 \tag{29}$$

$$20 < visp < 33 \tag{29-1}$$

Assuming that a focal length of the whole system at the wide angle end in the state where the object at infinity is in focus is fw, and a focal length of the second lens group is f2, it is preferable that the zoom lens satisfies Conditional Expression (30). By not allowing the corresponding value of Conditional Expression (30) to be equal to or less than the lower limit, the negative refractive power of the second lens group is prevented from becoming excessively weak. Thus, there is an advantage in achieving an increase in zoom ratio. By not allowing the corresponding value of Conditional Expression (30) to be equal to or greater than the upper limit, the negative refractive power of the second lens group is prevented from becoming excessively strong. Therefore, it is possible to suppress an increase in diameter of the rays incident on the intermediate group and the group closer to the image side than the intermediate group. Thus, there is an advantage in achieving reduction in size. By satisfying Conditional Expression (30), there is an advantage in achieving an increase in zoom ratio and reduction in size. In order to obtain more favorable characteristics, it is more preferable that the zoom lens satisfies Conditional Expression (30-1).

$$1 < fw/|f2| < 5 \quad (30)$$

$$2 < fw/|f2| < 3.5 \quad (30\text{-}1)$$

Specifically, each group can adopt, for example, the following configuration.

The first lens group may be configured to consist of one negative lens and two positive lenses. In such a case, there is an advantage in correcting longitudinal chromatic aberration, and there is an advantage in achieving reduction in weight as compared with the case where the first lens group consists of four or more lenses.

For example, the first lens group can be configured to consist of, in this order from the object side to the image side, a cemented lens, in which one negative lens and one positive lens are cemented, and one positive lens. More specifically, the first lens group can be configured to consist of, in order from the object side to the image side, a negative meniscus lens having a surface convex toward the object side, a biconvex lens, and a positive meniscus lens having a surface convex toward the object side.

It is preferable that the number of lenses forming the front group of the second lens group is three or less. In such a case, there is an advantage in achieving reduction in size and weight of the whole system.

The front group of the second lens group may be configured to consist of only one positive lens, or may be configured to consist of a cemented lens in which one positive lens and one negative lens are cemented.

It is preferable that the image stabilization group consists of two negative lenses and one positive lens. In such a case, there is an advantage in suppressing performance deterioration caused by fluctuation in chromatic aberration during image blur correction. Further, in a case where the image stabilization group consists of two negative lenses and one positive lens, chromatic aberration can be easily corrected as compared with the case where the image stabilization group consists of two or less lenses. Thus, as compared with a case where the image stabilization group consists of four or more lenses, there is an advantage in achieving reduction in size and weight of the image stabilization unit.

It is preferable that the image stabilization group includes a cemented lens in which a negative lens and a positive lens are cemented in order from the object side, or a cemented lens in which a positive lens and a negative lens are cemented in order from the object side. In such a case, there is an advantage in reducing the deterioration of the optical performance due to the assembly error.

For example, the image stabilization group can be configured to consist of, in this order from the object side to the image side, a cemented lens, in which one negative lens and one positive lens are cemented, and one negative lens. More specifically, the image stabilization group can be configured to consist of, in order from the object side to the image side, a cemented lens, in which a negative lens having a surface concave toward the image side and a positive meniscus lens having a surface convex toward the object side are cemented, and a negative lens having a surface concave toward the object side.

It is preferable that an aperture stop is disposed between the second lens group and the intermediate group. In such a case, the image stabilization group and the aperture stop are close to each other. Thus, there is an advantage in achieving reduction in diameter of the image stabilization group.

It is preferable that the intermediate group consists of two or less lens groups. In such a case, there is an advantage in achieving reduction in size and weight. For example, the intermediate A group can be configured to consist of one lens group, and the intermediate B group can be configured to consist of one lens group.

The subsequent group may be configured to consist of two lens groups of which mutual distance therebetween changes during zooming. For example, the subsequent group may be configured to consist of, in order from the object side to the image side, a lens group having a negative refractive power and a lens group having a positive refractive power. The subsequent group may be configured such that a distance between the lens group having the negative refractive power and the lens group having the positive refractive power changes during zooming. In such a case, the lens group having a negative refractive power deflects the ray in the direction away from the optical axis Z, and the lens group having a positive refractive power makes the angle between the ray and the optical axis Z smaller. Therefore, there is an advantage in reducing the incident angle of the principal ray of the off-axis rays incident on the image plane while ensuring a large image circle.

It is preferable that the lens group having the largest absolute value of the refractive power in the subsequent group includes at least one positive lens and at least one negative lens. In such a case, there is an advantage in correcting astigmatism and lateral chromatic aberration, and there is also an advantage in suppressing fluctuation in aberrations during zooming.

The zoom lens may be configured so that all the lens groups move during zooming, or may be configured to include a lens group that remains stationary with respect to the image plane during zooming. For example, the subsequent group may be configured to include a lens group that remains stationary with respect to the image plane during zooming at a position closest to the image side. In such a case, the lens group remaining stationary during zooming at the position closest to the image side is able to obtain the effect of suppressing fluctuation in lateral chromatic aberration during zooming. Further, the second lens group may be configured to remain stationary with respect to the image plane during zooming. In such a case, there is an advantage in reducing the deterioration of the optical performance due to the error, and there is an advantage in achieving reduction in size and weight of the apparatus since the apparatus can be further simplified.

The above-mentioned preferred configurations and available configurations including the configurations relating to the conditional expressions may be any combination, and it is preferable to appropriately selectively adopt the configurations in accordance with required specification.

As an example, the zoom lens according to a preferred aspect of the present disclosure comprises, in order from a position closest to an object side to an image side: a first lens group that has a positive refractive power; a second lens group that is disposed subsequent to the first lens group and has a negative refractive power; an intermediate group that includes at least one lens group and has a positive refractive power; and a subsequent group that includes at least one lens group and has a negative refractive power. During zooming, the first lens group moves along an optical axis, a distance between the first lens group and the second lens group changes, and a distance between the second lens group and the intermediate group changes, and a distance between the intermediate group and the subsequent group changes, the second lens group consists of, in order from the object side to the image side, a front group of the second lens group which remains stationary during image blur correction and an image stabilization group which moves in a direction intersecting the optical axis during image blur correction and has a negative refractive power, and Conditional Expressions (1) and (2) are satisfied. According to this preferred aspect, the zoom lens has image stabilization performance, is advantageous for achieving reduction in size and weight, and is able to easily maintain favorable optical performance.

Next, examples of the zoom lens of the present disclosure will be described with reference to the drawings.

Example 1

Figure 2:
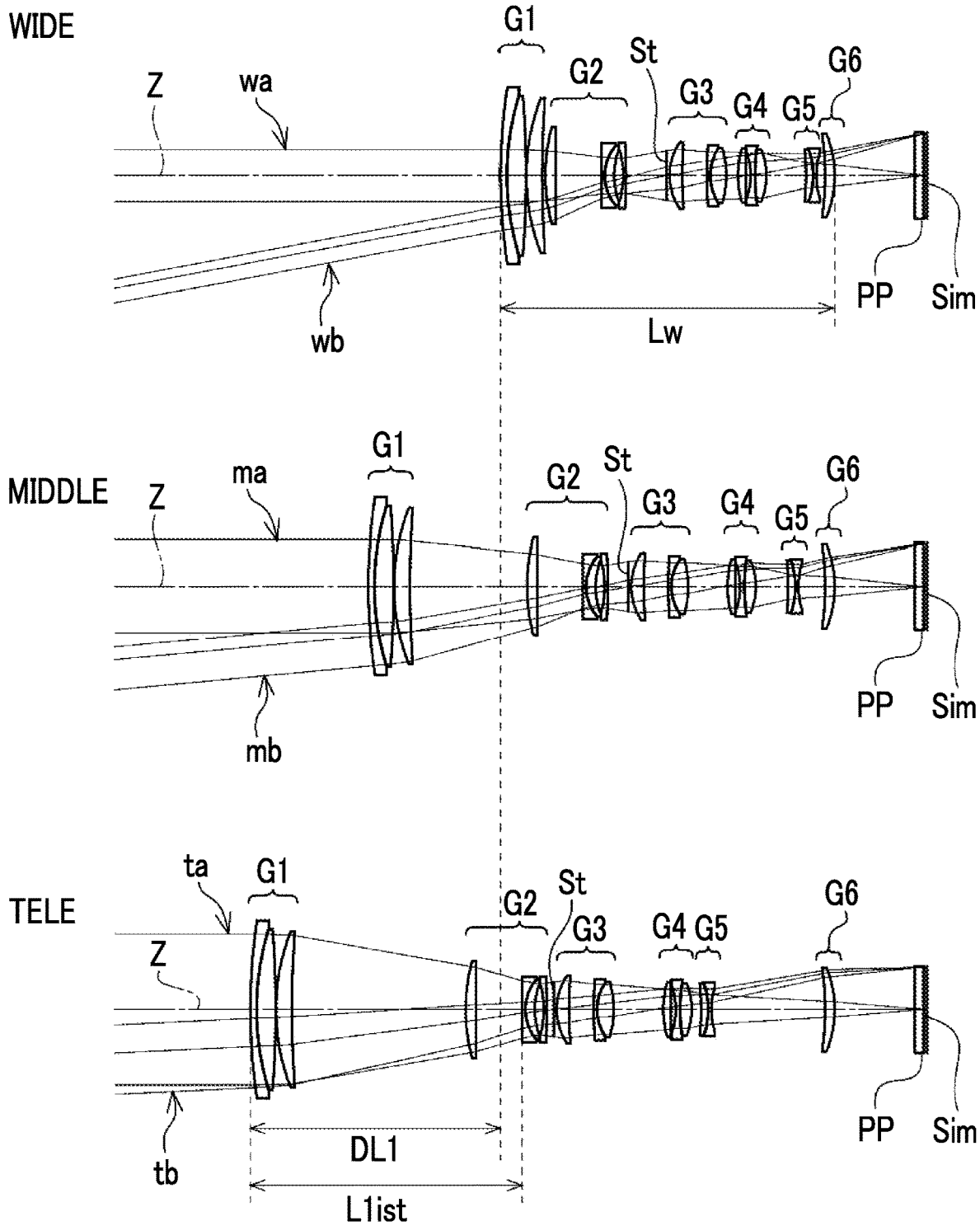
FIG. 2 is a cross-sectional view showing a configuration and rays in each zooming state of the zoom lens of Example 1.

FIG. 1 shows a cross-sectional view of the configuration of the zoom lens of Example 1 of the present disclosure at the wide angle end. FIG. 2 shows a cross-sectional view of the configuration and rays of this zoom lens in each zooming state. FIGS. 1 and 2 show situations where an object at infinity is in focus, the left side thereof is an object side, and the right side thereof is an image side. In FIG. 2, the upper part labeled by "WIDE" shows the wide angle end state, the middle part labeled by "MIDDLE" shows the middle focal length state, and the lower part labeled by "TELE" shows the telephoto end state. FIG. 2 shows rays including on-axis rays wa and rays with the maximum angle of view wb at the wide angle end state, on-axis rays ma and rays with the maximum angle of view mb at the middle focal length state, and on-axis rays ta and rays with the maximum angle of view tb at the telephoto end state. FIG. 2 shows Lw, DL1, and L1ist used in the above conditional expressions as an example.

The zoom lens of Example 1 consists of, in order from the object side to the image side along the optical axis Z, a first lens group G1, a second lens group G2, an aperture stop, a third lens group G3, a fourth lens group G4, a fifth lens group G5, and a sixth lens group G6. In the zoom lens, during zooming from the wide angle end to the telephoto end, the five lens groups from the first lens group G1 to the fifth lens group G5 move along the optical axis Z by changing the distance between the adjacent lens groups in the optical axis direction, the sixth lens group G6 remains stationary with respect to the image plane Sim, and the aperture stop St moves integrally with the third lens group G3. Below each lens group in FIG. 1, regarding the lens groups that move during zooming, an approximate direction of movement during zooming from the wide angle end to the telephoto end is shown by a single arrow, and a ground symbol is shown for the lens group that remains stationary during zooming. In the zoom lens of Example 1, the intermediate group consists of the third lens group G3 and the fourth lens group G4, and the subsequent group consists of the fifth lens group G5 and the sixth lens group G6.

The first lens group G1 consists of three lenses L11 to L13 in order from the object side to the image side. The second lens group G2 consists of four lenses L21 to L24 in order from the object side to the image side. The third lens group G3 consists of three lenses L31 to L33 in order from the object side to the image side. The fourth lens group G4 consists of three lenses L41 to L43 in order from the object side to the image side. The fifth lens group G5 consists of two lenses L51 and L52 in order from the object side to the image side. The sixth lens group G6 consists of one lens L61. The image stabilization group consists of three lenses L22 to L24. The focus group consists of the fourth lens group G4. In FIG. 1, a vertical double-headed arrow is noted below the image stabilization group, and a horizontal double-headed arrow is noted below the focus group.

In addition, FIGS. 1 and 2 show an example in which, assuming that a zoom lens is applied to an imaging apparatus, an optical member PP having a parallel plate shape is disposed between the zoom lens and the image plane Sim. The optical member PP is a member assumed to include at various filters, a cover glass, and/or the like. The various filters include, for example, a low pass filter, an infrared cut filter, and a filter that cuts a specific wavelength region. The optical member PP has no refractive power, and the optical member PP may be configured to be omitted.

Regarding the zoom lens of Example 1, Table 1 shows basic lens data, Table 2 shows specification and variable surface distance, and Table 3 shows aspheric surface coefficients thereof. In Table 1, the column of Sn shows surface numbers. The surface closest to the object side is the first surface, and the surface numbers increase one by one toward the image side. The column of R shows radii of curvature of the respective surfaces. The column of D shows surface distances on the optical axis between the respective surfaces and the surfaces adjacent to the image side. The column of Nd shows a refractive index of each constituent element at the d line, and the column of vd shows an Abbe number of each constituent element at the d line.

In Table 1, the sign of the radius of curvature of the surface convex toward the object side is positive and the sign of the radius of curvature of the surface convex toward the image side is negative. Table 1 also shows the aperture stop St and the optical member PP. In a place of a surface number of a surface corresponding to the aperture stop St, the surface number and a term of (St) are noted. A value at the bottom place of D in Table 1 indicates a distance between the image plane Sim and the surface closest to the image side in the table. In Table 1, the symbol DD[ ] is used for each variable surface distance during zooming, and the object side surface number of the distance is given in [ ] and is noted in the column D.

Table 2 shows the zoom ratio Zr, the focal length f, the open F number FNo., the maximum total angle of view 2ω, and the variable surface distance during zooming. (°) in the place of 2ω indicates that the unit thereof is a degree. In Table 2, the values in the wide angle end state, the middle focal length state, and the telephoto end state are shown in columns labeled WIDE, MIDDLE, and TELE, respectively. The values shown in Tables 1 and 2 are values in the case of using the d line as a reference in a state where the object at infinity is in focus.

In Table 1, the reference sign * is attached to surface numbers of aspheric surfaces, and numerical values of the paraxial radius of curvature are written into the column of the radius of curvature of the aspheric surface. In Table 3, the row of Sn shows surface numbers of the aspheric surfaces, and the rows of KA and Am (m=3, 4, 5, . . . , 10) shows numerical values of the aspheric surface coefficients for each aspheric surface. The "E±n" (n: an integer) in numerical values of the aspheric surface coefficients of Table 3 indicates "×10$^{±n}$". KA and Am are the aspheric surface coefficients in the aspheric surface expression represented by the following expression.

$$Zd = C \times h^2 / \{1 + (1 - KA \times C^2 \times h^2)^{1/2}\} + \Sigma Am \times h^m$$

Here,

Zd is an aspheric surface depth (a length of a perpendicular from a point on an aspheric surface at height h to a plane that is perpendicular to the optical axis and contacts with the vertex of the aspheric surface), h is a height (a distance from the optical axis to the lens surface), C is an inverse of the paraxial radius of curvature, KA and Am are aspheric surface coefficients, and $\Sigma$ in the aspheric surface expression means the sum with respect to m.

In data of each table, a degree is used as a unit of an angle, and mm (millimeter) is used as a unit of a length, but appropriate different units may be used since the optical system can be used even in a case where the system is enlarged or reduced in proportion. Each of the following tables shows numerical values rounded off to predetermined decimal places.

TABLE 1

Example 1

| Sn | R | D | Nd | vd |
|---|---|---|---|---|
| 1 | 206.29219 | 2.000 | 1.91082 | 35.25 |
| 2 | 92.61100 | 6.290 | 1.48749 | 70.42 |
| 3 | −348.39649 | 0.100 | | |
| 4 | 72.85426 | 5.250 | 1.49700 | 81.59 |
| 5 | 401.19231 | DD[5] | | |
| 6 | 61.75210 | 3.470 | 1.48749 | 70.39 |
| 7 | ∞ | 14.951 | | |
| 8 | ∞ | 1.010 | 1.78590 | 44.17 |
| 9 | 15.63300 | 3.160 | 1.92286 | 20.89 |
| 10 | 26.73519 | 2.931 | | |
| 11 | −31.18271 | 1.000 | 1.91082 | 35.25 |
| 12 | −221.14090 | DD[12] | | |
| 13(St) | ∞ | 1.000 | | |
| *14 | 20.38050 | 4.150 | 1.58313 | 59.38 |
| *15 | 211.70314 | 8.090 | | |
| 16 | 199.40281 | 1.000 | 1.83481 | 42.73 |
| 17 | 16.50800 | 5.480 | 1.49700 | 81.61 |
| 18 | −32.80289 | DD[18] | | |
| 19 | 32.74333 | 2.580 | 1.83481 | 42.73 |
| 20 | ∞ | 1.567 | | |
| 21 | −23.09227 | 1.430 | 1.78470 | 26.27 |
| 22 | 71.40700 | 3.750 | 1.73800 | 32.33 |
| 23 | −23.27688 | DD[23] | | |
| 24 | −92.91465 | 2.380 | 1.92119 | 23.96 |
| 25 | −26.32000 | 1.010 | 1.78800 | 47.52 |
| 26 | 26.32000 | DD[26] | | |
| 27 | −109.91337 | 3.190 | 1.58144 | 40.75 |
| 28 | −38.02918 | 26.310 | | |
| 29 | ∞ | 2.850 | 1.54763 | 54.98 |
| 30 | ∞ | 1.139 | | |

TABLE 2

Example 1

| | WIDE | MIDDLE | TELE |
|---|---|---|---|
| Zr | 1.0 | 2.0 | 4.0 |
| f | 72.118 | 144.236 | 291.358 |
| FNo. | 4.11 | 4.62 | 5.76 |
| 2ω(°) | 21.8 | 11.0 | 5.6 |
| DD[5] | 0.999 | 38.238 | 57.009 |
| DD[12] | 13.319 | 6.720 | 2.224 |
| DD[18] | 3.875 | 13.038 | 16.268 |
| DD[23] | 12.940 | 10.585 | 3.046 |
| DD[26] | 2.835 | 8.681 | 37.443 |

TABLE 3

Example 1

| Sn | 14 | 15 |
|---|---|---|
| KA | 1.0000000E+00 | 1.0000000E+00 |
| A3 | 0.0000000E+00 | 0.0000000E+00 |
| A4 | −5.7977453E−06 | 7.0429674E−06 |
| A5 | 1.9069508E−07 | −1.6063152E−07 |
| A6 | −1.3138935E−07 | −6.4035922E−09 |
| A7 | 3.3398108E−08 | 1.7295082E−08 |
| A8 | −3.2768000E−09 | −2.4892221E−09 |
| A9 | 7.9633108E−11 | 9.8110299E−11 |
| A10 | 5.2428800E−12 | 3.7353005E−12 |

Figure 3:
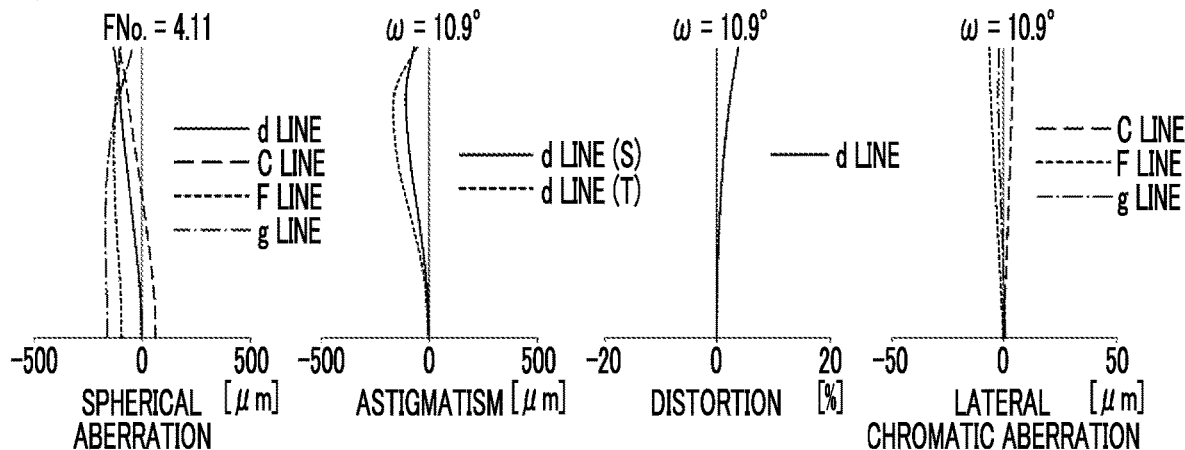
FIG. 3 is a diagram showing aberrations of the zoom lens of Example 1.
Figure 3:
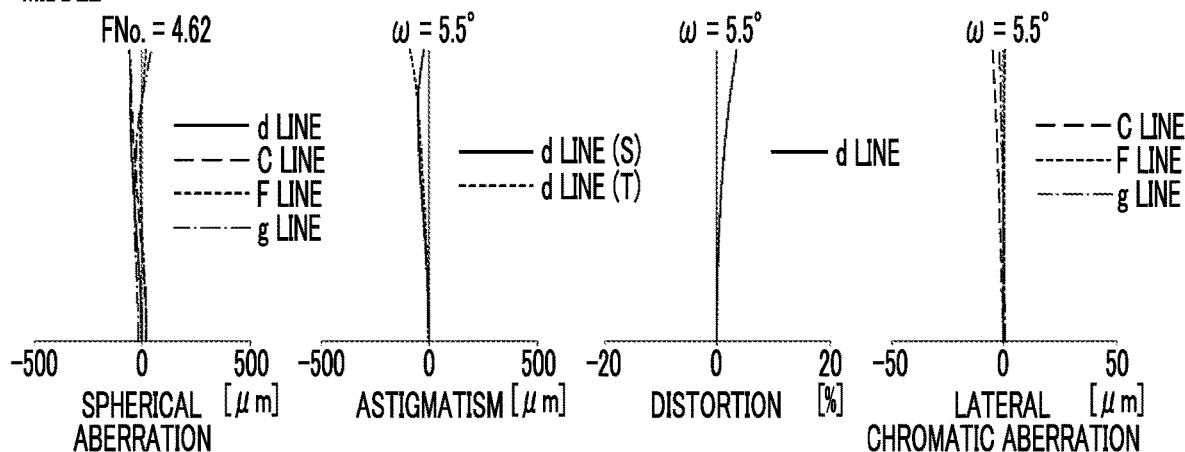
Figure 3:
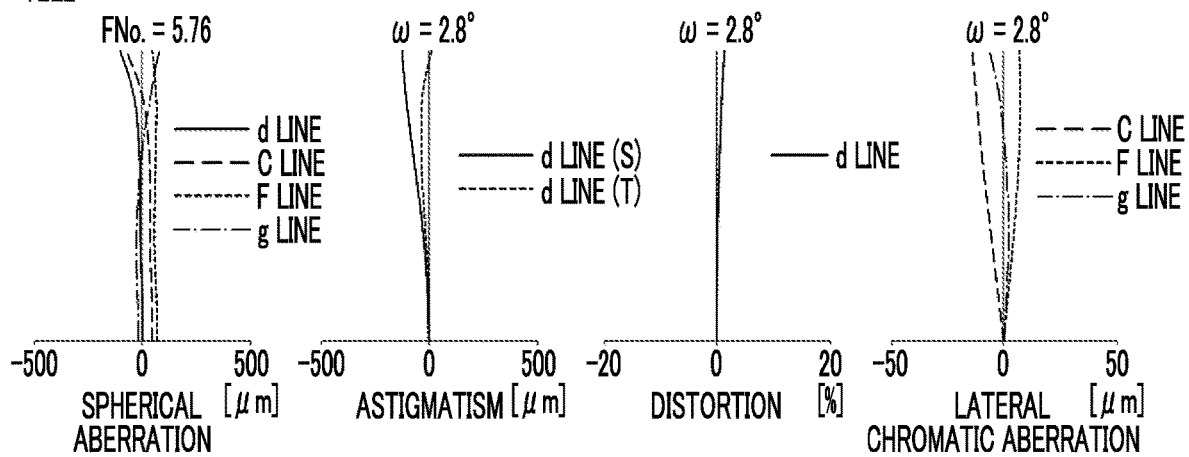

FIG. 3 is a diagram showing aberrations of the zoom lens of Example 1 in a state where the object at infinity is in focus. In FIG. 3, in order from the left side, spherical aberration, astigmatism, distortion, and lateral chromatic aberration are shown. In FIG. 3, the upper part labeled by "WIDE" shows aberrations in the wide angle end state, the middle part labeled by "MIDDLE" shows aberrations in the middle focal length state, and the lower part labeled by "TELE" shows aberrations in the telephoto end state. In spherical aberration diagram, aberrations at the d line, the C line, the F line, and the g line are indicated by the solid line, the long dashed line, the short dashed line, and the chain line, respectively. In the astigmatism diagram, aberration in the sagittal direction at the d line is indicated by the solid line, and aberration in the tangential direction at the d line is indicated by the short dashed line. In the distortion diagram, aberration at the d line is indicated by the solid line. In lateral chromatic aberration diagram, aberrations at the C line, the F line, and the g line are respectively indicated by the long dashed line, the short dashed line, and the chain line. In spherical aberration diagram, FNo. indicates an F number. In the other aberration diagrams, ω indicates a half angle of view. FIG. 3 shows values of FNo. and ω corresponding to the upper part in the vertical axis of each diagram.

Symbols, meanings, description methods, and illustration methods of the respective data pieces according to Example 1 are the same as those in the following examples unless otherwise specified. Therefore, in the following description, repeated description will be omitted.

Example 2

Figure 4:
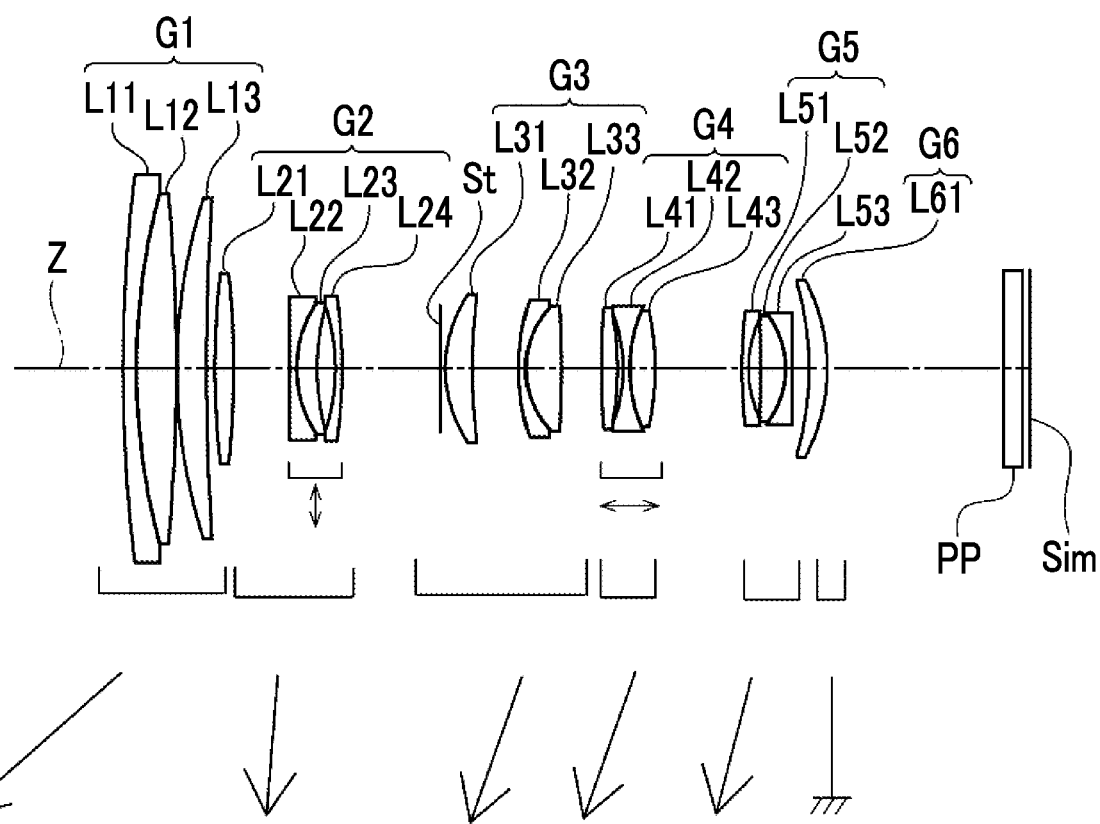
FIG. 4 is a cross-sectional view of a configuration of a zoom lens of Example 2 and a diagram showing movement directions thereof.

FIG. 4 shows a cross-sectional view of the configuration at the wide angle end of the zoom lens of Example 2 in a state where the object at infinity is in focus. The zoom lens of Example 2 consists of, in order from the object side to the image side along the optical axis Z, a first lens group G1, a second lens group G2, an aperture stop, a third lens group G3, a fourth lens group G4, a fifth lens group G5, and a sixth lens group G6. In the zoom lens, during zooming from the wide angle end to the telephoto end, the five lens groups from the first lens group G1 to the fifth lens group G5 move along the optical axis Z by changing the distance between the adjacent lens groups in the optical axis direction, the sixth lens group G6 remains stationary with respect to the image plane Sim, and the aperture stop St moves integrally with the third lens group G3. In the zoom lens of Example 2, the intermediate group consists of the third lens group G3 and the fourth lens group G4, and the subsequent group consists of the fifth lens group G5 and the sixth lens group G6.

The first lens group G1 consists of three lenses L11 to L13 in order from the object side to the image side. The second lens group G2 consists of four lenses L21 to L24 in order from the object side to the image side. The third lens group G3 consists of three lenses L31 to L33 in order from the object side to the image side. The fourth lens group G4 consists of three lenses L41 to L43 in order from the object side to the image side. The fifth lens group G5 consists of three lenses L51 to L53 in order from the object side to the image side. The sixth lens group G6 consists of one lens L61. The image stabilization group consists of three lenses L22 to L24. The focus group consists of the fourth lens group G4.

Figure 5:
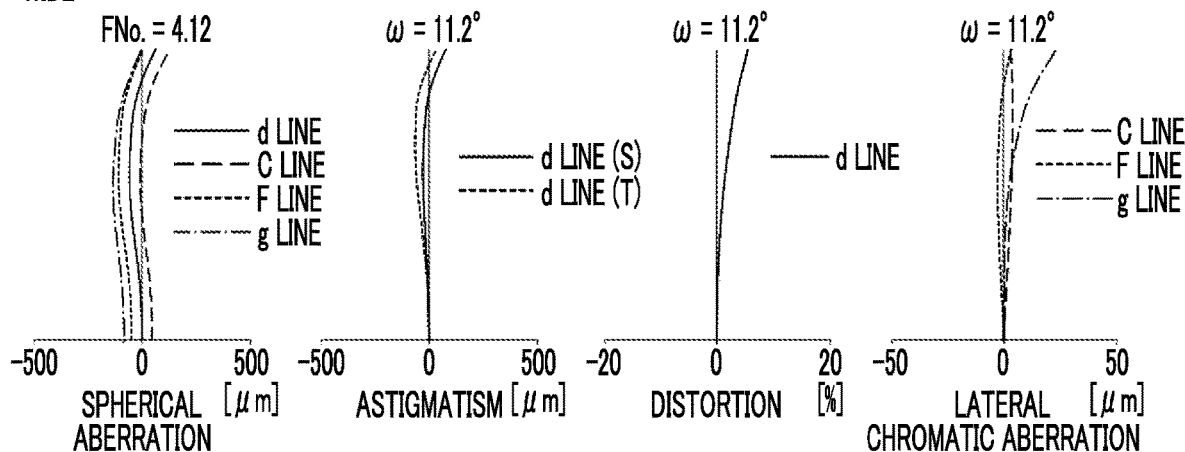
FIG. 5 is a diagram showing aberrations of the zoom lens of Example 2.
Figure 5:
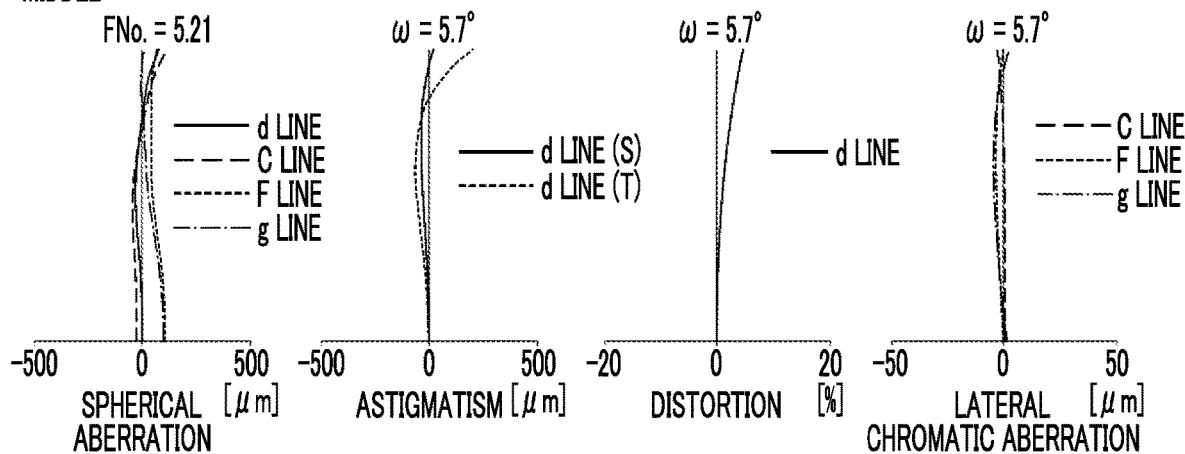
Figure 5:
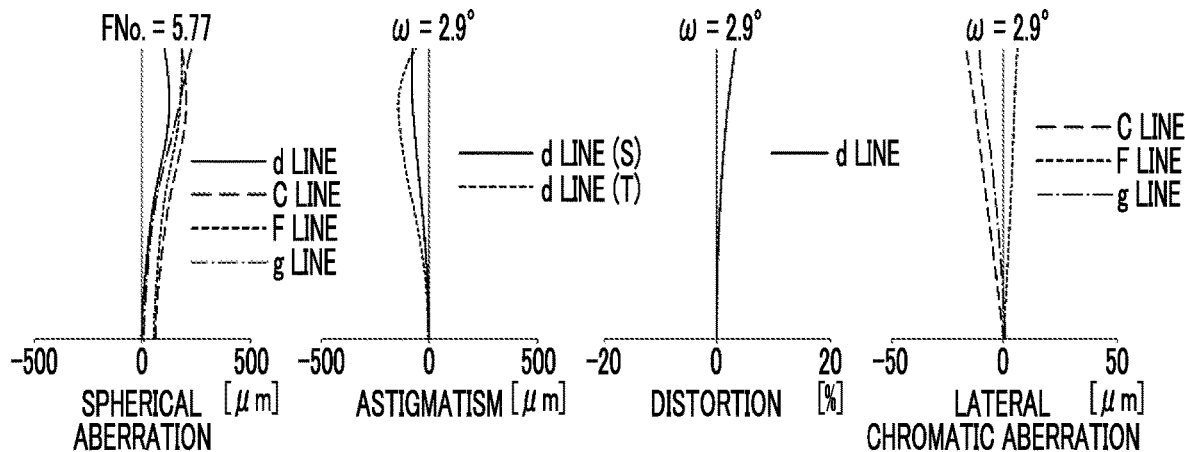

Regarding the zoom lens of Example 2, Table 4 shows basic lens data, Table 5 shows specification and variable surface distances, and Table 6 shows aspheric surface coefficients thereof, and FIG. 5 shows aberration diagrams.

TABLE 4

Example 2

| Sn | R | D | Nd | vd |
|---|---|---|---|---|
| 1 | 250.87223 | 2.000 | 1.80610 | 33.27 |
| 2 | 105.30174 | 5.927 | 1.48749 | 70.42 |
| 3 | −303.52760 | 0.100 | | |
| 4 | 87.46594 | 4.389 | 1.49700 | 81.59 |
| 5 | 399.65657 | DD[5] | | |
| 6 | 140.62589 | 2.785 | 1.48749 | 70.42 |
| 7 | −140.62589 | 8.374 | | |
| 8 | ∞ | 1.010 | 1.83481 | 42.74 |
| 9 | 18.33540 | 3.050 | 1.89286 | 20.36 |
| 10 | 36.43153 | 2.712 | | |
| 11 | −31.28675 | 1.000 | 1.91082 | 35.25 |
| 12 | −79.39477 | DD[12] | | |
| 13(St) | ∞ | 0.750 | | |
| *14 | 19.98987 | 4.043 | 1.58313 | 59.38 |
| *15 | 97.37526 | 6.858 | | |
| 16 | 35.73001 | 1.000 | 1.88300 | 39.22 |
| 17 | 13.94110 | 5.223 | 1.49700 | 81.59 |
| 18 | −241.76478 | DD[18] | | |
| 19 | 132.45690 | 2.361 | 1.78800 | 47.37 |
| 20 | −50.27079 | 0.860 | | |
| 21 | −23.33672 | 1.010 | 1.63980 | 34.47 |
| 22 | 23.33672 | 3.750 | 1.87070 | 40.73 |
| 23 | −43.37114 | DD[23] | | |
| 24 | 76.20188 | 1.000 | 1.74100 | 52.64 |
| 25 | 17.84587 | 1.707 | | |
| 26 | −965.00477 | 3.782 | 1.64769 | 33.79 |
| 27 | −13.93074 | 1.000 | 1.78800 | 47.37 |
| 28 | ∞ | DD[28] | | |
| 29 | −47.33994 | 2.692 | 1.91082 | 35.25 |
| 30 | −29.43105 | 26.295 | | |
| 31 | ∞ | 2.850 | 1.54763 | 54.98 |
| 32 | ∞ | 1.118 | | |

TABLE 5

Example 2

| | WIDE | MIDDLE | TELE |
|---|---|---|---|
| Zr | 1.0 | 2.0 | 4.0 |
| f | 72.075 | 144.150 | 291.184 |
| FNo. | 4.12 | 5.20 | 5.77 |
| 2ω(°) | 21.6 | 11.0 | 5.6 |
| DD[5] | 1.285 | 43.002 | 81.265 |
| DD[12] | 14.647 | 6.105 | 1.786 |
| DD[18] | 6.015 | 8.482 | 16.446 |
| DD[23] | 12.943 | 12.086 | 2.270 |
| DD[28] | 2.520 | 13.722 | 22.611 |

TABLE 6

Example 2

| Sn | 14 | 15 |
|---|---|---|
| KA | 1.0000000E+00 | 1.0000000E+00 |
| A3 | 0.0000000E+00 | 0.0000000E+00 |
| A4 | −1.9928253E−06 | 8.5881366E−06 |
| A5 | −8.7170296E−07 | −1.1041250E−06 |
| A6 | 2.3035450E−07 | 2.8920056E−07 |
| A7 | −3.4175125E−08 | −4.3448393E−08 |
| A8 | 2.1044007E−09 | 3.2281461E−09 |
| A9 | 4.0533371E−12 | −8.4229097E−11 |
| A10 | −5.2428824E−12 | −2.4193979E−12 |

Example 3

Figure 6:
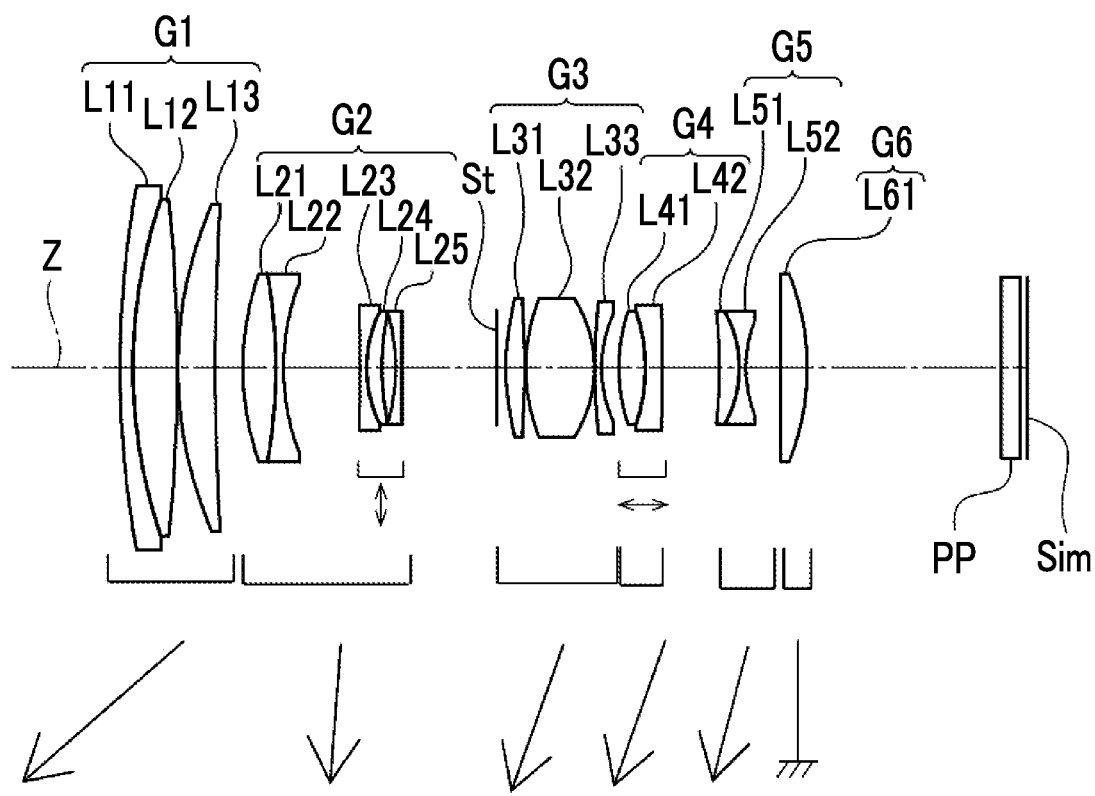
FIG. 6 is a cross-sectional view of a configuration of a zoom lens of Example 3 and a diagram showing movement directions thereof.

FIG. 6 shows a cross-sectional view of the configuration at the wide angle end of the zoom lens of Example 3 in a state where the object at infinity is in focus. The zoom lens of Example 3 consists of, in order from the object side to the image side along the optical axis Z, a first lens group G1, a second lens group G2, an aperture stop, a third lens group G3, a fourth lens group G4, a fifth lens group G5, and a sixth lens group G6. In the zoom lens, during zooming from the wide angle end to the telephoto end, the five lens groups from the first lens group G1 to the fifth lens group G5 move along the optical axis Z by changing the distance between the adjacent lens groups in the optical axis direction, the sixth lens group G6 remains stationary with respect to the image plane Sim, and the aperture stop St moves integrally with the third lens group G3. In the zoom lens of Example 3, the intermediate group consists of the third lens group G3 and the fourth lens group G4, and the subsequent group consists of the fifth lens group G5 and the sixth lens group G6.

The first lens group G1 consists of three lenses L11 to L13 in order from the object side to the image side. The second lens group G2 consists of five lenses L21 to L25 in order from the object side to the image side. The third lens group G3 consists of three lenses L31 to L33 in order from the object side to the image side. The fourth lens group G4 consists of two lenses L41 to L42 in order from the object side to the image side. The fifth lens group G5 consists of two lenses L51 and L52 in order from the object side to the image side. The sixth lens group G6 consists of one lens L61. The image stabilization group consists of three lenses L23 to L25. The focus group consists of the fourth lens group G4.

Figure 7:
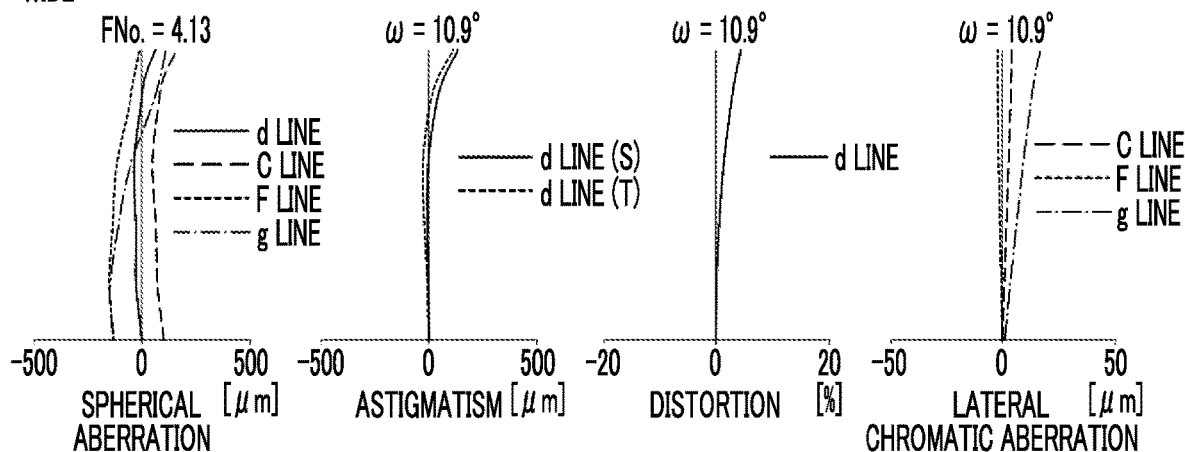
FIG. 7 is a diagram showing aberrations of the zoom lens of Example 3.
Figure 7:
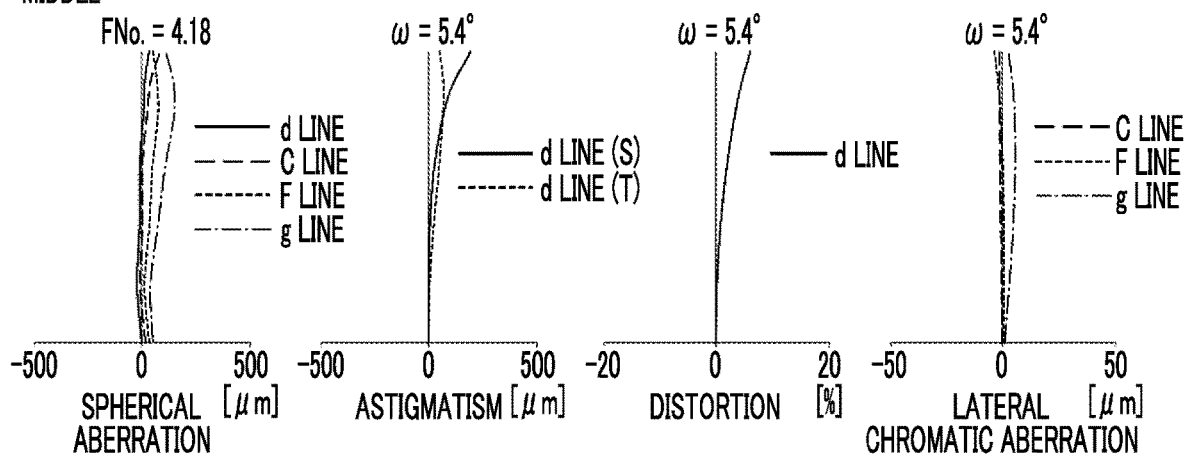
Figure 7:
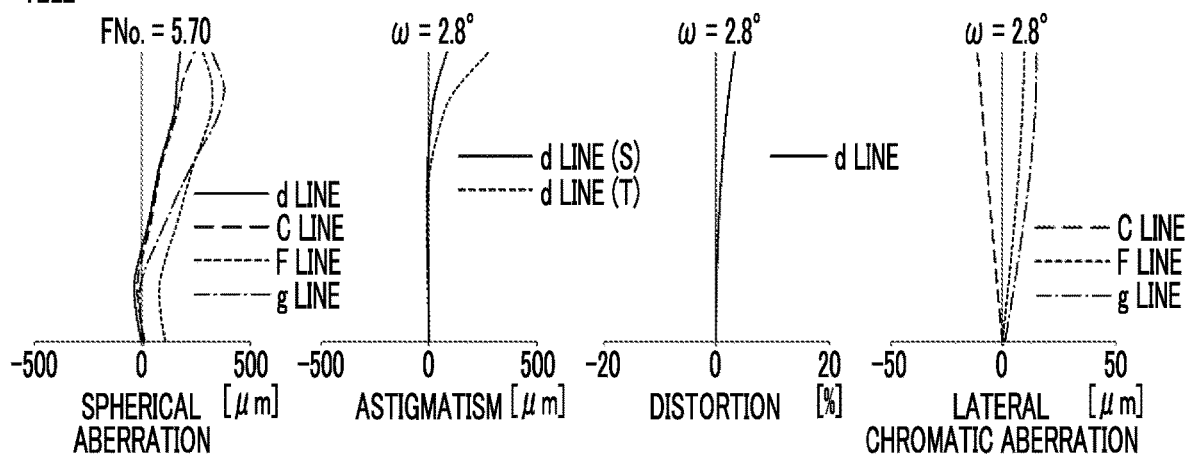

Regarding the zoom lens of Example 3, Table 7 shows basic lens data, Table 8 shows specification and variable surface distances, and Table 9 shows aspheric surface coefficients thereof, and FIG. 7 shows aberration diagrams.

TABLE 7

Example 3

| Sn | R | D | Nd | vd |
|---|---|---|---|---|
| 1 | 166.59780 | 2.000 | 1.91082 | 35.25 |
| 2 | 85.11296 | 6.850 | 1.53775 | 74.70 |
| 3 | −271.98598 | 0.100 | | |
| 4 | 67.22483 | 5.750 | 1.49700 | 81.61 |
| 5 | 400.05909 | DD[5] | | |
| 6 | 46.40002 | 5.107 | 1.60300 | 65.44 |
| 7 | −86.03107 | 1.000 | 1.49700 | 81.61 |
| 8 | 38.26149 | 11.857 | | |
| 9 | −299.75994 | 1.010 | 1.95375 | 32.32 |

TABLE 7-continued

Example 3

| Sn | R | D | Nd | vd |
|---|---|---|---|---|
| 10 | 20.93172 | 2.377 | 1.98613 | 16.48 |
| 11 | 44.07436 | 2.111 | | |
| 12 | −32.26585 | 1.000 | 1.88300 | 40.76 |
| 13 | ∞ | DD[13] | | |
| 14(St) | ∞ | 1.500 | | |
| *15 | 40.46496 | 2.953 | 1.58313 | 59.38 |
| *16 | −70.97676 | 0.100 | | |
| 17 | 30.36208 | 10.625 | 1.43875 | 94.66 |
| 18 | −21.21602 | 0.100 | | |
| 19 | 107.96053 | 1.000 | 1.90366 | 31.31 |
| 20 | 20.95730 | DD[20] | | |
| 21 | 30.43167 | 4.071 | 1.84666 | 23.78 |
| 22 | −29.10715 | 2.662 | 1.98613 | 16.48 |
| 23 | −259.11585 | DD[23] | | |
| 24 | −87.72723 | 3.097 | 1.90366 | 31.31 |
| 25 | −18.87620 | 1.010 | 1.77250 | 49.60 |
| 26 | 21.79820 | DD[26] | | |
| 27 | 2032.60979 | 4.128 | 1.48749 | 70.44 |
| 28 | −41.52570 | 29.892 | | |
| 29 | ∞ | 2.850 | 1.54763 | 54.98 |
| 30 | ∞ | 1.195 | | |

TABLE 8

Example 3

| | WIDE | MIDDLE | TELE |
|---|---|---|---|
| Zr | 1.0 | 2.0 | 4.0 |
| f | 72.145 | 144.291 | 291.467 |
| FNo. | 4.13 | 4.18 | 5.70 |
| 2ω(°) | 21.8 | 10.8 | 5.6 |
| DD[5] | 4.306 | 33.546 | 42.787 |
| DD[13] | 14.582 | 8.711 | 1.296 |
| DD[20] | 2.699 | 17.130 | 24.557 |
| DD[23] | 8.801 | 6.364 | 2.748 |
| DD[26] | 5.349 | 3.024 | 29.594 |

TABLE 9

Example 3

| Sn | 14 | 15 |
|---|---|---|
| KA | 1.0000000E+00 | 1.0000000E+00 |
| A3 | 0.0000000E+00 | 0.0000000E+00 |
| A4 | −7.4717611E−06 | 2.3402113E−05 |
| A5 | −5.7058727E−07 | 6.4328155E−07 |
| A6 | 1.2997755E−07 | −3.6792554E−08 |
| A7 | −1.2190563E−08 | −6.4637261E−09 |
| A8 | −7.1328468E−10 | 2.3685359E−09 |
| A9 | 3.7301651E−10 | 2.1692872E−11 |
| A10 | −2.7539149E−11 | −1.4225501E−11 |

Example 4

Figure 8:
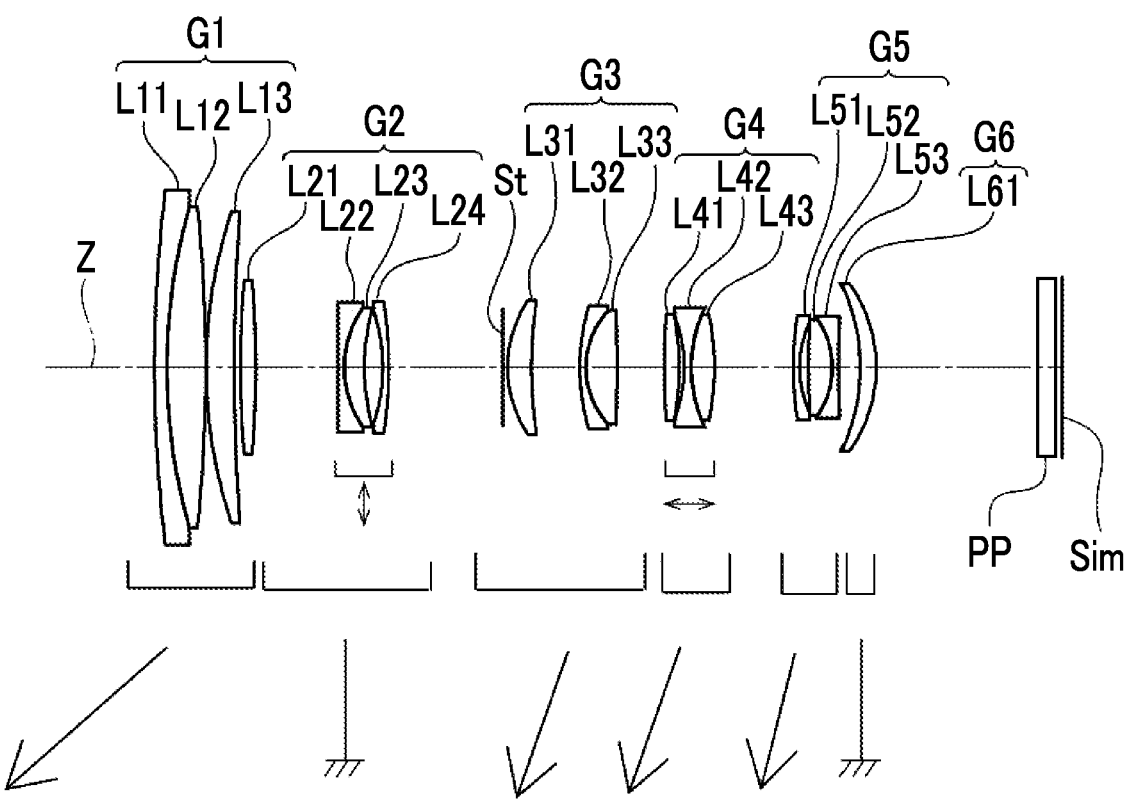
FIG. 8 is a cross-sectional view of a configuration of a zoom lens of Example 4 and a diagram showing movement directions thereof.

FIG. 8 shows a cross-sectional view of the configuration at the wide angle end of the zoom lens of Example 4 in a state where the object at infinity is in focus. The zoom lens of Example 4 consists of, in order from the object side to the image side along the optical axis Z, a first lens group G1, a second lens group G2, an aperture stop, a third lens group G3, a fourth lens group G4, a fifth lens group G5, and a sixth lens group G6. In this zoom lens, during zooming from the wide angle end to the telephoto end, four lens groups of a first lens group G1, a third lens group G3, a fourth lens group G4, and a fifth lens group G5 move along the optical axis Z by changing the distance between the adjacent lens groups in the optical axis direction, the second lens group G2 and the sixth lens group G6 remain stationary with respect to the image plane Sim, and the aperture stop St moves integrally with the third lens group G3. In the zoom lens of Example 4, the intermediate group consists of the third lens group G3 and the fourth lens group G4, and the subsequent group consists of the fifth lens group G5 and the sixth lens group G6.

The first lens group G1 consists of three lenses L11 to L13 in order from the object side to the image side. The second lens group G2 consists of four lenses L21 to L24 in order from the object side to the image side. The third lens group G3 consists of three lenses L31 to L33 in order from the object side to the image side. The fourth lens group G4 consists of three lenses L41 to L43 in order from the object side to the image side. The fifth lens group G5 consists of three lenses L51 to L53 in order from the object side to the image side. The sixth lens group G6 consists of one lens L61. The image stabilization group consists of three lenses L22 to L24. The focus group consists of the fourth lens group G4.

Figure 9:
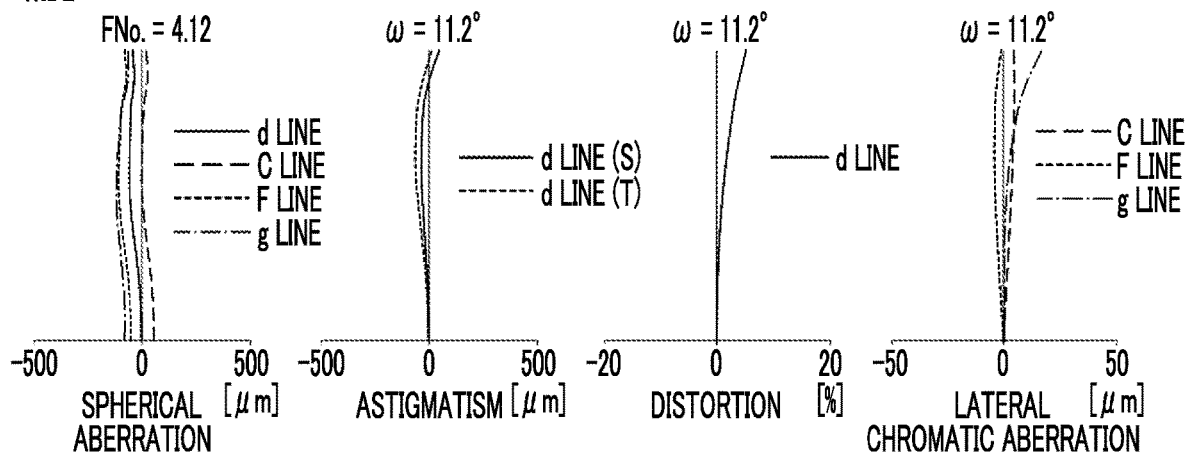
FIG. 9 is a diagram showing aberrations of the zoom lens of Example 4.
Figure 9:
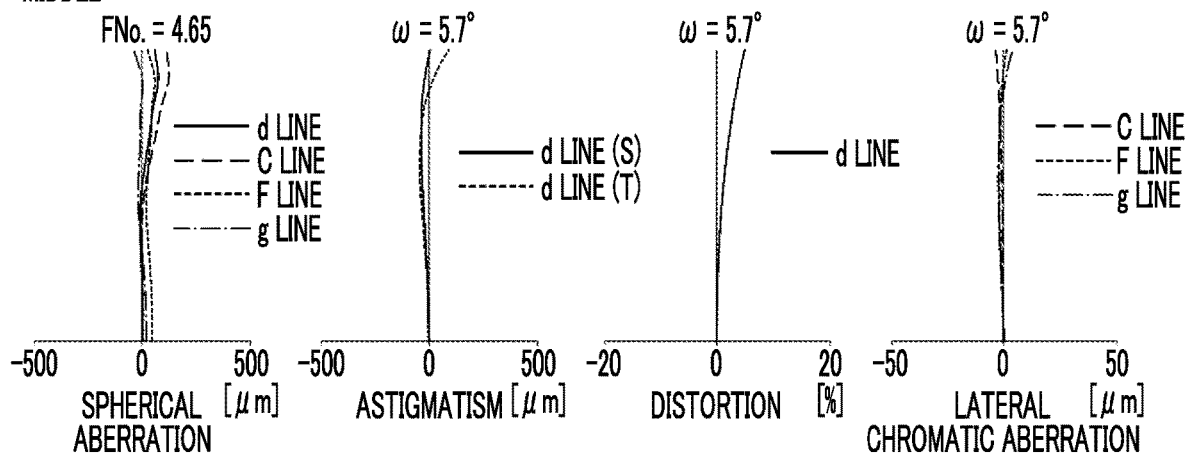
Figure 9:
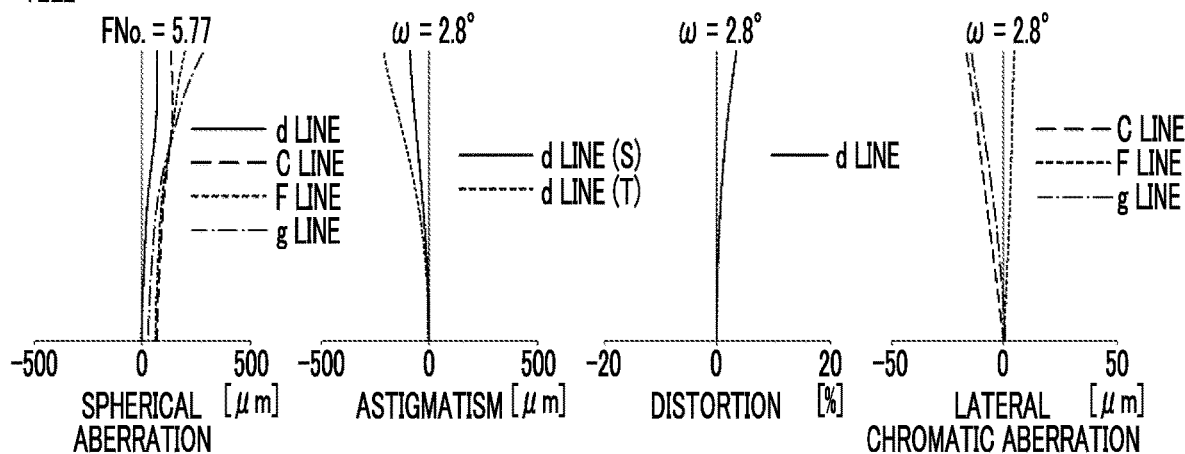

Regarding the zoom lens of Example 4, Table 10 shows basic lens data, Table 11 shows specification and variable surface distances, and Table 12 shows aspheric surface coefficients thereof, and FIG. 9 shows aberration diagrams.

TABLE 10

Example 4

| Sn | R | D | Nd | vd |
|---|---|---|---|---|
| 1 | 254.07527 | 2.000 | 1.80610 | 33.27 |
| 2 | 100.16956 | 6.274 | 1.48749 | 70.42 |
| 3 | −270.04988 | 0.100 | | |
| 4 | 83.92452 | 4.568 | 1.49700 | 81.59 |
| 5 | 394.41685 | DD[5] | | |
| 6 | 183.49891 | 2.446 | 1.48749 | 70.42 |
| 7 | −183.53469 | 13.227 | | |
| 8 | ∞ | 1.011 | 1.83481 | 42.74 |
| 9 | 17.99368 | 3.250 | 1.89286 | 20.36 |
| 10 | 37.83196 | 2.965 | | |
| 11 | −31.07695 | 1.000 | 1.95375 | 32.32 |
| 12 | −72.72799 | DD[12] | | |
| 13(St) | ∞ | 0.750 | | |
| *14 | 20.19515 | 3.890 | 1.58313 | 59.38 |
| *15 | 80.22129 | 7.855 | | |
| 16 | 36.93867 | 1.000 | 1.88300 | 39.22 |
| 17 | 14.36717 | 5.074 | 1.49700 | 81.59 |
| 18 | −250.69470 | DD[18] | | |
| 19 | 134.07652 | 2.386 | 1.78800 | 47.37 |
| 20 | −49.43463 | 0.857 | | |
| 21 | −23.56084 | 1.135 | 1.63980 | 34.47 |
| 22 | 23.56084 | 3.750 | 1.87070 | 40.73 |
| 23 | −45.52795 | DD[23] | | |
| 24 | 58.98198 | 1.000 | 1.74100 | 52.64 |
| 25 | 18.33857 | 1.453 | | |
| 26 | 144.88405 | 3.857 | 1.64769 | 33.79 |
| 27 | −14.74163 | 1.000 | 1.78800 | 47.37 |
| 28 | 175.58333 | DD[28] | | |
| 29 | −33.66681 | 2.601 | 1.80610 | 33.27 |
| 30 | −24.66375 | 26.221 | | |
| 31 | ∞ | 2.850 | 1.54763 | 54.98 |
| 32 | ∞ | 1.127 | | |

TABLE 11

Example 4

| | WIDE | MIDDLE | TELE |
|---|---|---|---|
| Zr | 1.0 | 2.0 | 4.0 |
| f | 72.087 | 144.174 | 291.231 |

TABLE 11-continued

Example 4

| | WIDE | MIDDLE | TELE |
|---|---|---|---|
| FNo. | 4.12 | 4.65 | 5.77 |
| 2ω(°) | 21.6 | 11.0 | 5.6 |
| DD[5] | 1.018 | 41.596 | 72.481 |
| DD[12] | 18.532 | 9.309 | 1.726 |
| DD[18] | 7.648 | 10.071 | 18.476 |
| DD[23] | 12.847 | 11.439 | 2.292 |
| DD[28] | 3.361 | 11.545 | 19.862 |

TABLE 12

Example 4

| Sn | 14 | 15 |
|---|---|---|
| KA | 1.0000000E+00 | 1.0000000E+00 |
| A3 | 0.0000000E+00 | 0.0000000E+00 |
| A4 | −1.6693880E−06 | 7.7614047E−06 |
| A5 | −8.3412472E−07 | −9.5064558E−07 |
| A6 | 2.1943876E−07 | 2.4003477E−07 |
| A7 | −3.3899930E−08 | −3.7251968E−08 |
| A8 | 2.4176128E−09 | 3.2647523E−09 |
| A9 | −2.4787767E−11 | −1.2773873E−10 |
| A10 | −5.2428815E−12 | −1.3309567E−12 |

Example 5

Figure 10:
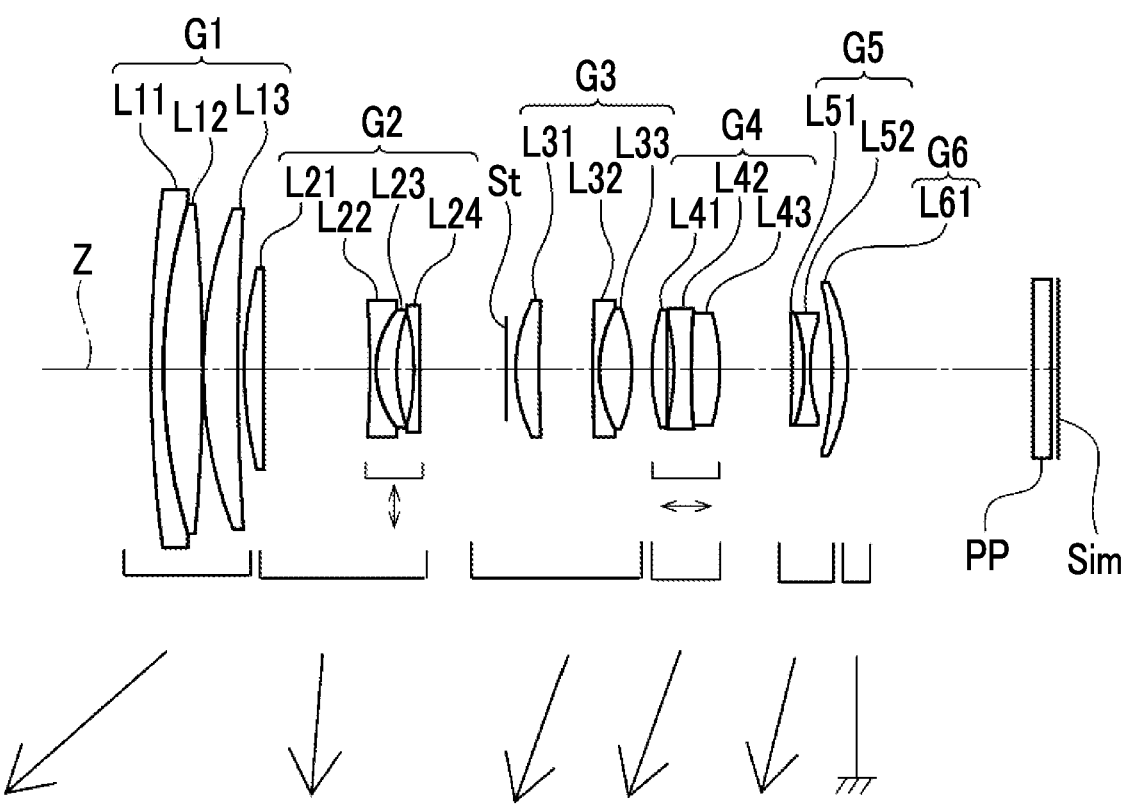
FIG. 10 is a cross-sectional view of a configuration of a zoom lens of Example 5 and a diagram showing movement directions thereof.

FIG. 10 shows a cross-sectional view of the configuration at the wide angle end of the zoom lens of Example 5 in a state where the object at infinity is in focus. The zoom lens of Example 5 consists of, in order from the object side to the image side along the optical axis Z, a first lens group G1, a second lens group G2, an aperture stop, a third lens group G3, a fourth lens group G4, a fifth lens group G5, and a sixth lens group G6. In the zoom lens, during zooming from the wide angle end to the telephoto end, the five lens groups from the first lens group G1 to the fifth lens group G5 move along the optical axis Z by changing the distance between the adjacent lens groups in the optical axis direction, the sixth lens group G6 remains stationary with respect to the image plane Sim, and the aperture stop St moves integrally with the third lens group G3. In the zoom lens of Example 5, the intermediate group consists of the third lens group G3 and the fourth lens group G4, and the subsequent group consists of the fifth lens group G5 and the sixth lens group G6.

The first lens group G1 consists of three lenses L11 to L13 in order from the object side to the image side. The second lens group G2 consists of four lenses L21 to L24 in order from the object side to the image side. The third lens group G3 consists of three lenses L31 to L33 in order from the object side to the image side. The fourth lens group G4 consists of three lenses L41 to L43 in order from the object side to the image side. The fifth lens group G5 consists of two lenses L51 and L52 in order from the object side to the image side. The sixth lens group G6 consists of one lens L61. The image stabilization group consists of three lenses L22 to L24. The focus group consists of the fourth lens group G4.

Figure 11:
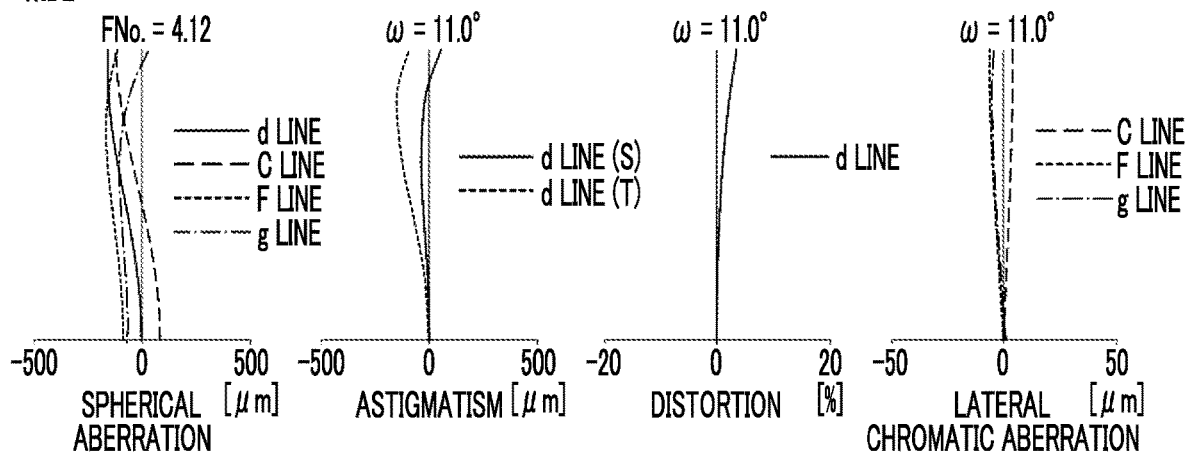
FIG. 11 is a diagram showing aberrations of the zoom lens of Example 5.
Figure 11:
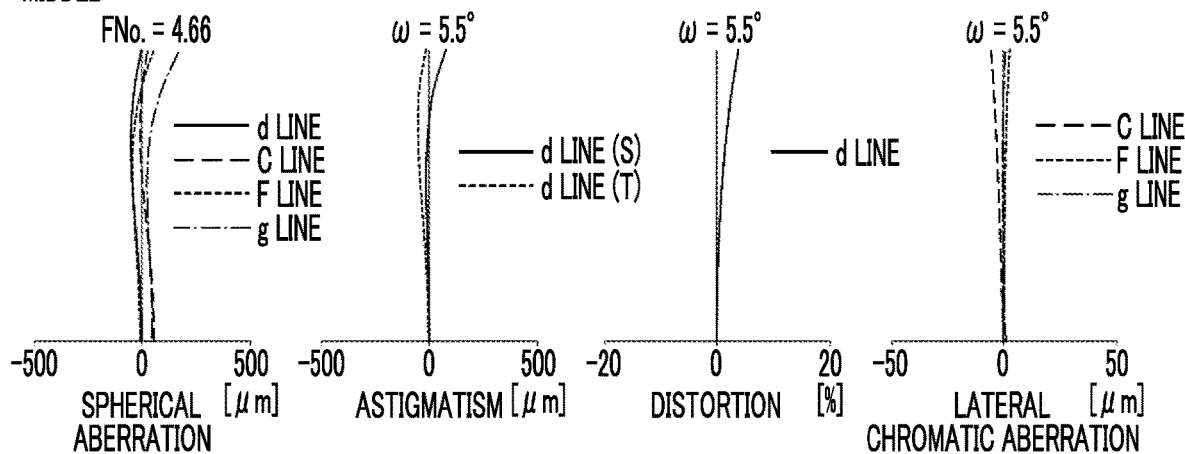
Figure 11:
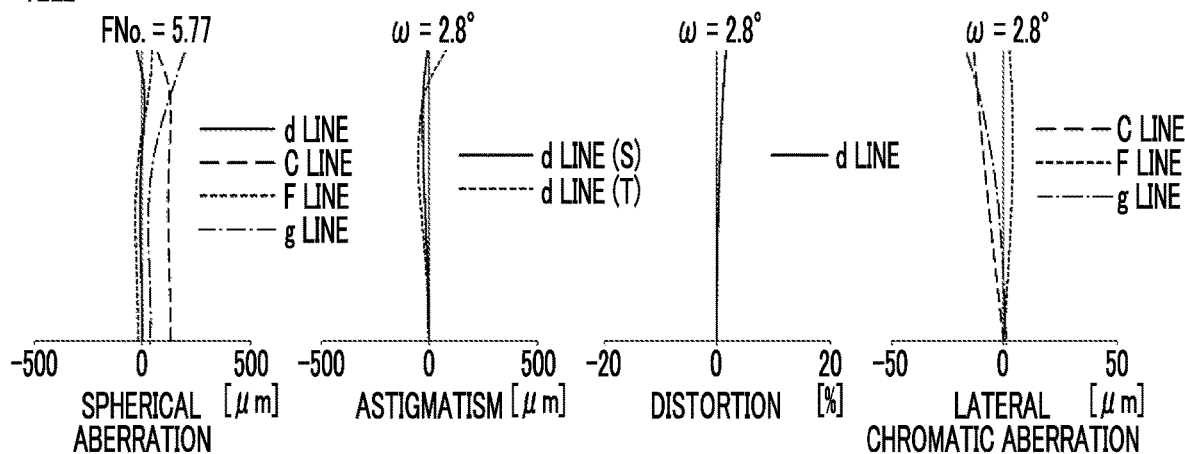

Regarding the zoom lens of Example 5, Table 13 shows basic lens data, Table 14 shows specification and variable surface distances, and Table 15 shows aspheric surface coefficients thereof, and FIG. 11 shows aberration diagrams.

TABLE 13

Example 5

| Sn | R | D | Nd | νd |
|---|---|---|---|---|
| 1 | 223.19562 | 2.000 | 1.91082 | 35.25 |
| 2 | 95.18429 | 6.182 | 1.48749 | 70.44 |
| 3 | −303.16549 | 0.100 | | |
| 4 | 73.55061 | 5.500 | 1.49700 | 81.61 |
| 5 | 400.05795 | DD[5] | | |
| 6 | 66.40803 | 3.081 | 1.48749 | 70.44 |
| 7 | ∞ | 16.774 | | |
| 8 | −173.87769 | 1.010 | 1.75500 | 52.32 |
| 9 | 15.62491 | 3.250 | 1.92119 | 23.96 |
| 10 | 28.62313 | 2.723 | | |
| 11 | −37.40437 | 1.000 | 1.91082 | 35.25 |
| 12 | ∞ | DD[12] | | |
| 13(St) | ∞ | 1.500 | | |
| *14 | 24.39651 | 3.731 | 1.58313 | 59.46 |
| *15 | 640.03276 | 8.352 | | |
| 16 | 413.72968 | 1.000 | 1.83481 | 42.74 |
| 17 | 20.55215 | 5.098 | 1.49700 | 81.61 |
| 18 | −28.05035 | DD[18] | | |
| 19 | 33.84068 | 2.449 | 1.78800 | 47.37 |
| 20 | ∞ | 1.025 | | |
| 21 | −35.21923 | 2.750 | 1.75575 | 24.71 |
| 22 | 125.00563 | 4.510 | 1.72047 | 34.71 |
| 23 | −34.31286 | DD[23] | | |
| 24 | −139.08043 | 1.842 | 1.92119 | 23.96 |
| 25 | −29.72012 | 1.010 | 1.78800 | 47.37 |
| 26 | 24.18590 | DD[26] | | |
| 27 | −55.68093 | 2.419 | 1.66382 | 27.35 |
| 28 | −34.02470 | 29.353 | | |
| 29 | ∞ | 2.850 | 1.54763 | 54.98 |
| 30 | ∞ | 1.146 | | |

TABLE 14

Example 5

| | WIDE | MIDDLE | TELE |
|---|---|---|---|
| Zr | 1.0 | 2.0 | 4.0 |
| f | 72.102 | 144.205 | 291.294 |
| FNo. | 4.12 | 4.66 | 5.77 |
| 2ω(°) | 22.0 | 11.0 | 5.6 |
| DD[5] | 1.000 | 37.755 | 56.634 |
| DD[12] | 13.628 | 7.078 | 2.453 |
| DD[18] | 3.198 | 15.274 | 18.788 |
| DD[23] | 11.464 | 9.194 | 1.993 |
| DD[26] | 3.467 | 7.657 | 34.630 |

TABLE 15

Example 5

| Sn | 14 | 15 |
|---|---|---|
| KA | 1.0000000E+00 | 1.0000000E+00 |
| A3 | 0.0000000E+00 | 0.0000000E+00 |
| A4 | −1.8476524E−06 | 1.0156779E−05 |
| A5 | 5.0693734E−07 | 4.6058114E−07 |
| A6 | −1.2840486E−07 | −1.0184763E−07 |
| A7 | 1.3047210E−08 | 6.1814506E−09 |
| A8 | −4.1064596E−10 | 6.1484724E−10 |
| A9 | −2.5544624E−11 | −1.0649134E−10 |
| A10 | 1.3165304E−12 | 3.7829322E−12 |

Table 16 shows corresponding values of Conditional Expressions (1) to (30) of the zoom lenses of Examples 1 to 5.

TABLE 16

| Expression Number | Expression | Example 1 | Example 2 | Example 3 | Example 4 | Example 5 |
|---|---|---|---|---|---|---|
| (1) | DL1/Lw | 0.75 | 0.83 | 0.61 | 0.61 | 0.74 |
| (2) | $|(1 - \beta ist) \times \beta isrt|$ | 5.05 | 3.92 | 5.19 | 3.77 | 4.99 |
| (3) | fmA/fmB | 0.95 | 1.02 | 0.96 | 1.07 | 0.90 |
| (4) | DmAB/fmB | 0.38 | 0.39 | 0.66 | 0.43 | 0.42 |
| (5) | $|(1 - \beta mBt^2) \times \beta mBrt^2|$ | 6.56 | 5.70 | 6.71 | 5.10 | 6.63 |
| (6) | L1ist/f1 | 0.610 | 0.655 | 0.585 | 0.655 | 0.613 |
| (7) | fw/|fis| | 3.73 | 2.84 | 3.82 | 2.77 | 3.71 |
| (8) | fw/fmw | 2.53 | 2.44 | 3.16 | 2.27 | 2.62 |
| (9) | ft/fmt | 8.14 | 8.16 | 7.98 | 7.59 | 8.06 |
| (10) | fmt/fmw | 1.25 | 1.21 | 1.60 | 1.21 | 1.30 |
| (11) | fw/|fsmax| | 2.54 | 3.14 | 2.84 | 2.76 | 2.46 |
| (12) | ft/fw | 4.04 | 4.04 | 4.04 | 4.04 | 4.04 |
| (13) | Lw/fw | 1.52 | 1.38 | 1.47 | 1.54 | 1.53 |
| (14) | Bfw/fw | 0.41 | 0.41 | 0.46 | 0.40 | 0.45 |
| (15) | (R1r + R2f)/(R1r − R2f) | 1.36 | 2.09 | 1.26 | 2.74 | 1.40 |
| (16) | $|(1 - \beta isw) \times \beta isrw|$ | 2.44 | 2.27 | 2.53 | 2.10 | 2.40 |
| (17) | $|(1 - \beta mBw^2) \times \beta mBrw^2|$ | 3.34 | 4.19 | 4.35 | 3.93 | 3.68 |
| (18) | fw/f1 | 0.49 | 0.45 | 0.66 | 0.47 | 0.49 |
| (19) | ft/f1 | 2.00 | 1.82 | 2.68 | 1.89 | 1.98 |
| (20) | ft/|f2| | 10.25 | 8.47 | 13.69 | 8.60 | 10.36 |
| (21) | fmw/|f2| | 1.00 | 0.86 | 1.07 | 0.94 | 0.98 |
| (22) | fmt/|f2| | 1.26 | 1.04 | 1.72 | 1.13 | 1.29 |
| (23) | vmp | 81.61 | 81.59 | 94.66 | 81.59 | 81.61 |
| (24) | v2p | 70.39 | 70.42 | 65.44 | 70.42 | 70.44 |
| (25) | (R1f + R1r)/(R1f − R1r) | −3.12 | −4.37 | −2.43 | −4.62 | −3.52 |
| (26) | vave1p | 76.01 | 76.01 | 78.16 | 76.01 | 76.03 |
| (27) | vave2n | 39.71 | 39.00 | 51.56 | 37.53 | 43.79 |
| (28) | vavemAp | 70.50 | 70.49 | 77.02 | 70.49 | 70.54 |
| (29) | visp | 20.89 | 20.36 | 32.32 | 20.36 | 23.96 |
| (30) | fw/|f2| | 2.54 | 2.10 | 3.39 | 2.13 | 2.57 |

As can be seen from the above data, the zoom lenses of Examples 1 to 5 have image stabilization performance, and each are configured to achieve reduction in size and weight and achieve favorable optical performance by satisfactorily correcting various aberrations even though the zoom ratio is 4 or more. Further, the zoom lenses of Examples 1 to 5 are suitable as, for example, a telephoto zoom lens.

Figure 12:
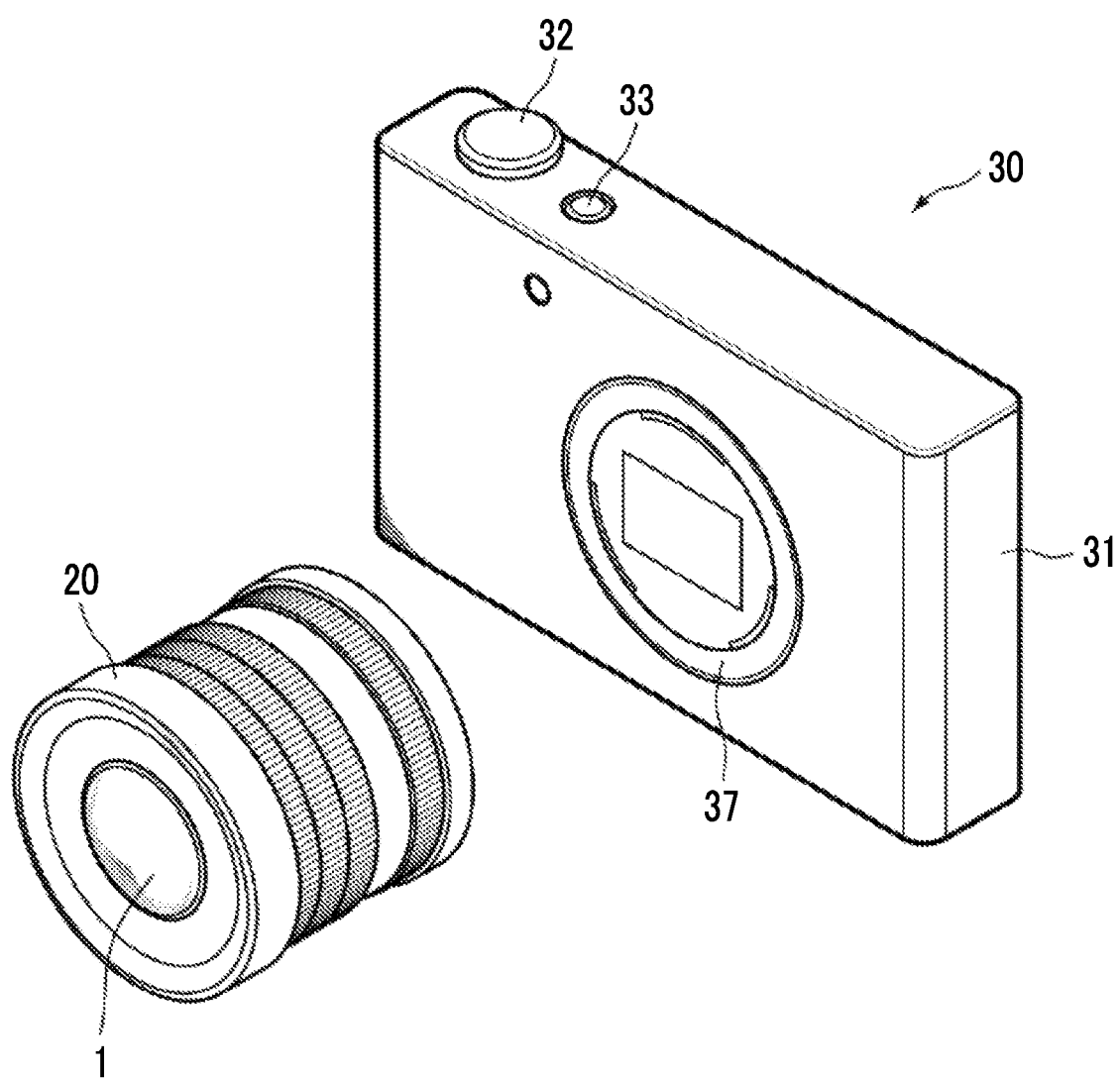
FIG. 12 is a perspective view of the front side of an imaging apparatus according to an embodiment.
Figure 13:
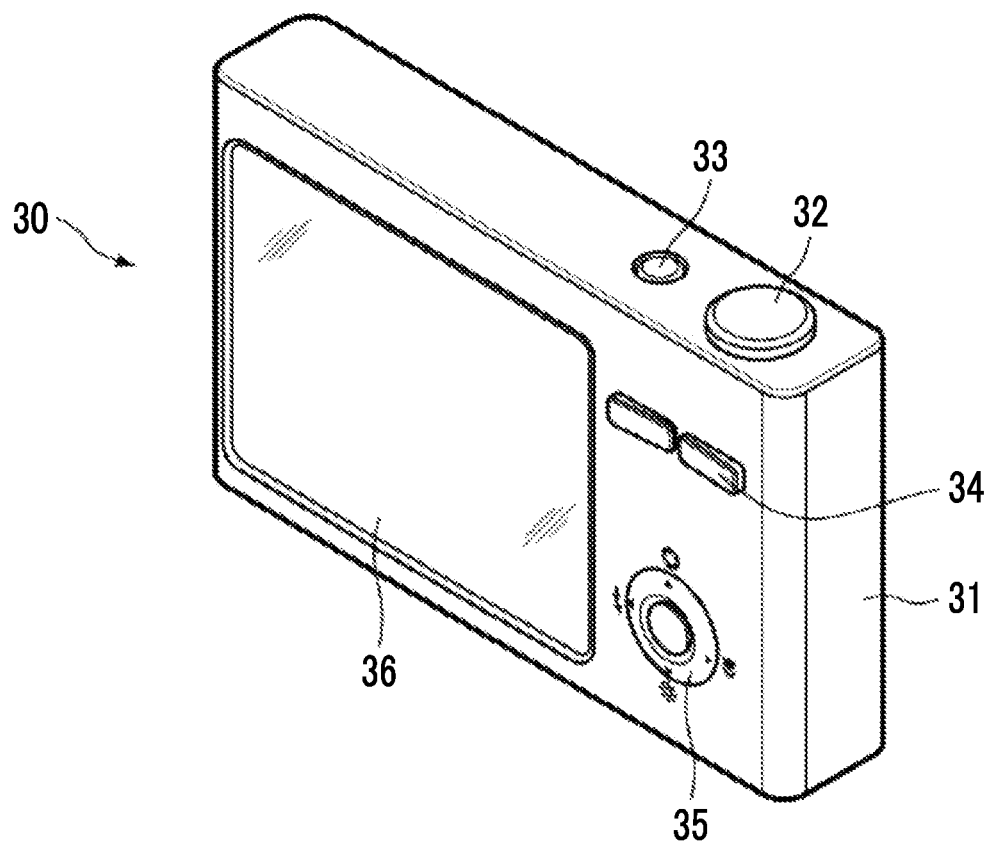
FIG. 13 is a perspective view of the rear side of the imaging apparatus according to the embodiment.

Next, an imaging apparatus according to an embodiment of the present disclosure will be described. FIGS. 12 and 13 are external views of a camera 30 which is the imaging apparatus according to the embodiment of the present disclosure. FIG. 12 is a perspective view of the camera 30 viewed from the front side, and FIG. 13 is a perspective view of the camera 30 viewed from the rear side. The camera 30 is a so-called mirrorless type digital camera, and the interchangeable lens 20 can be detachably attached thereto. The interchangeable lens 20 is configured to include the zoom lens 1, which is housed in a lens barrel, according to an embodiment of the present disclosure.

The camera 30 comprises a camera body 31, and a shutter button 32 and a power button 33 are provided on an upper surface of the camera body 31. Further, an operation section 34, an operation section 35, and a display section 36 are provided on a rear surface of the camera body 31. The display section 36 is able to display a captured image and an image within an angle of view before imaging.

An imaging aperture, through which light from an imaging target is incident, is provided at the center on the front surface of the camera body 31. A mount 37 is provided at a position corresponding to the imaging aperture. The interchangeable lens 20 is mounted on the camera body 31 with the mount 37 interposed therebetween.

In the camera body 31, there are provided an imaging element, a signal processing circuit, a storage medium, and the like. The imaging element such as a charge coupled device (CCD) or a complementary metal oxide semiconductor (CMOS) outputs a captured image signal based on a subject image which is formed through the interchangeable lens 20. The signal processing circuit generates an image through processing of the captured image signal which is output from the imaging element. The storage medium stores the generated image. The camera 30 is able to capture a still image or a video by pressing the shutter button 32, and is able to store image data, which is obtained through imaging, in the storage medium.

The technology of the present disclosure has been hitherto described through embodiments and examples, but the technology of the present disclosure is not limited to the above-mentioned embodiments and examples, and may be modified into various forms. For example, values such as the radius of curvature, the surface distance, the refractive index, the Abbe number, and the aspheric surface coefficient of each lens are not limited to the values shown in the examples, and different values may be used therefor.

Further, the imaging apparatus according to the embodiment of the present disclosure is not limited to the above example, and may be modified into various forms such as a camera other than the mirrorless type, a film camera, and a video camera.

What is claimed is:

1. A zoom lens consisting of, in order from a position closest to an object side to an image side: a first lens group that has a positive refractive power; a second lens group that is disposed subsequent to the first lens group and has a negative refractive power; an intermediate group that includes at least one lens group and has a positive refractive power; and a subsequent group that includes at least one lens group and has a negative refractive power, wherein during zooming, the first lens group moves along an optical axis, a distance between the first lens group and the second lens group changes, and a distance between the second lens group and the intermediate group changes, and a distance between the intermediate group and the subsequent group changes, the second lens group consists of, in order from the object side to the image side, a front group of the second lens group which remains stationary during image blur correction and an image stabilization group which moves in a direction intersecting the optical axis during image blur correction and has a negative refractive power, and assuming that a difference in an optical axis direction between a position of the first lens group at a telephoto end and a position of the first lens group at a wide angle end is DL1, a distance on the optical axis from a lens surface closest to the object side in the zoom lens at the wide angle end to a lens surface closest to the image side in the zoom lens at the wide angle end is Lw, a lateral magnification of the image stabilization group at the telephoto end in a state where an object at infinity is in focus is βist, and a combined lateral magnification of all lenses closer to the image side than the image stabilization group at the telephoto end in the state where the object at infinity is in focus is βisrt, Conditional Expressions (1) and (2) are satisfied, which are represented by $$0.4 < DL1/Lw < 1 \qquad (1), \text{ and}$$

$$3.5 < |(1-\beta ist) \times \beta isrt| < 7 \qquad (2),$$

the intermediate group consists of an intermediate A group having a positive refractive power and an intermediate B group having a positive refractive power in order from the object side to the image side, a distance between the intermediate A group and the intermediate B group changes during zooming, the front group of the second lens group has a positive refractive power, the subsequent group consists of a lens group having a negative refractive power and a lens group having a positive refractive power in order from the object side to the image side, and a distance between the lens group having the negative refractive power of the subsequent group and the lens group having the positive refractive power of the subsequent group changes during zooming.

2. The zoom lens according to claim 1, wherein only the intermediate B group moves along the optical axis during focusing.

3. The zoom lens according to claim 2, wherein assuming that a focal length of the intermediate A group is fmA, and a focal length of the intermediate B group is fmB, Conditional Expression (3) is satisfied, which is represented by $$0.5 < fmA/fmB < 2 \qquad (3).$$

4. The zoom lens according to claim 2, wherein assuming that a distance on the optical axis between the intermediate A group and the intermediate B group at the telephoto end in the state where the object at infinity is in focus is DmAB, and a focal length of the intermediate B group is fmB, Conditional Expression (4) is satisfied, which is represented by $$0.3 < DmAB/fmB < 1 \qquad (4).$$

5. The zoom lens according to claim 2, wherein assuming that a lateral magnification of the intermediate B group at the telephoto end in the state where the object at infinity is in focus is βmBt, and a combined lateral magnification of all lenses closer to the image side than the intermediate B group at the telephoto end in the state where the object at infinity is in focus is βmBrt, Conditional Expression (5) is satisfied, which is represented by $$3 < |(1-\beta mBt^2) \times \beta mBrt^2| < 10 \qquad (5).$$

6. The zoom lens according to claim 1, wherein assuming that a distance on the optical axis from a lens surface closest to the object side in the zoom lens at the telephoto end to a lens surface closest to the object side in the image stabilization group at the telephoto end is L1ist, and a focal length of the first lens group is f1, Conditional Expression (6) is satisfied, which is represented by $$0.57 < L1ist/f1 < 0.7 \qquad (6).$$

7. The zoom lens according to claim 1, wherein assuming that a focal length of the zoom lens at the wide angle end in the state where the object at infinity is in focus is fw, and a focal length of the image stabilization group is fis, Conditional Expression (7) is satisfied, which is represented by $$1 < fw/|fis| < 5 \qquad (7).$$

8. The zoom lens according to claim 1, wherein assuming that a focal length of the zoom lens at the wide angle end in the state where the object at infinity is in focus is fw, and a focal length of the intermediate group at the wide angle end in the state where the object at infinity is in focus is fmw, Conditional Expression (8) is satisfied, which is represented by $$1 < fw/fmw < 5 \qquad (8).$$

9. The zoom lens according to claim 1, wherein assuming that a focal length of the zoom lens at the telephoto end in the state where the object at infinity is in focus is ft, and a focal length of the intermediate group at the telephoto end in the state where the object at infinity is in focus is fmt, Conditional Expression (9) is satisfied, which is represented by $$5 < ft/fmt < 10 \qquad (9).$$

10. The zoom lens according to claim 1, wherein assuming that a focal length of the intermediate group at the telephoto end in the state where the object at infinity is in focus is fmt, and a focal length of the intermediate group at the wide angle end in the state where the object at infinity is in focus is fmw, Conditional Expression (10) is satisfied, which is represented by $$0.8 < fmt/fmw < 1.8 \qquad (10).$$

11. The zoom lens according to claim 1, wherein assuming that a focal length of the zoom lens at the wide angle end in the state where the object at infinity is in focus is fw, and a focal length of a lens group having a strongest negative refractive power in the subsequent group is fsmax, Conditional Expression (11) is satisfied, which is represented by $$1 < fw/|fsmax| < 4 \qquad (11).$$

12. The zoom lens according to claim 1, wherein a stop is disposed between the second lens group and the intermediate group.

13. The zoom lens according to claim 1, wherein assuming that a focal length of the zoom lens at the telephoto end in the state where the object at infinity is in focus is ft, and a focal length of the zoom lens at the wide angle end in the state where the object at infinity is in focus is fw, Conditional Expression (12) is satisfied, which is represented by $$3 < ft/fw < 5 \qquad (12).$$

14. The zoom lens according to claim 1, wherein assuming that a focal length of the zoom lens at the wide angle end in the state where the object at infinity is in focus is fw, Conditional Expression (13) is satisfied, which is represented by $$1.3 < Lw/fw < 1.6 \qquad (13).$$

15. The zoom lens according to claim 1, wherein assuming that a back focal length of the zoom lens at an air conversion distance at the wide angle end in the state where the object at infinity is in focus is Bfw, and a focal length of the zoom lens at the wide angle end in the state where the object at infinity is in focus is fw, Conditional Expression (14) is satisfied, which is represented by $$0.35 < Bfw/fw < 0.55 \qquad (14).$$

16. The zoom lens according to claim 1, wherein the lens group having the positive refractive power of the subsequent group remains stationary with respect to an image plane during zooming.

17. An imaging apparatus comprising the zoom lens according to claim 1.

\* \* \* \* \*